US012775963B2

(12) United States Patent
Kovachev et al.

(10) Patent No.: US 12,775,963 B2
(45) Date of Patent: Oct. 27, 2026

(54) AUTO-SEGMENTATION FOR CUSTOMER DATA PLATFORMS

(71) Applicant: Treasure Data, Inc., Mountain View, CA (US)

(72) Inventors: Dilyan Kovachev, New York, NY (US); Yi Shuen Lim, New York, NY (US)

(73) Assignee: Treasure Data, Inc., Mountain View, CA (US)

( * ) Notice: Subject to any disclaimer, the term of this patent is extended or adjusted under 35 U.S.C. 154(b) by 0 days.

(21) Appl. No.: 18/949,129

(22) Filed: Nov. 15, 2024

(65) Prior Publication Data

US 2026/0065325 A1 Mar. 5, 2026

Related U.S. Application Data

(60) Provisional application No. 63/688,971, filed on Aug. 30, 2024.

(51) Int. Cl.
*G06Q 30/0251* (2023.01)
*G06F 18/23213* (2023.01)

(52) U.S. Cl.
CPC ... *G06Q 30/0269* (2013.01); *G06F 18/23213* (2023.01)

(58) Field of Classification Search
CPC ................ G06Q 30/02–0277; G06F 18/23213
See application file for complete search history.

(56) References Cited

U.S. PATENT DOCUMENTS

| | | | |
|---|---|---|---|
| 2010/0010878 A1 | 1/2010 | Pinto et al. | |
| 2014/0180804 A1 | 6/2014 | Jordan et al. | |
| 2018/0240036 A1 | 8/2018 | Boada et al. | |
| 2021/0133782 A1 | 5/2021 | Mahajan et al. | |
| 2022/0405783 A1 | 12/2022 | Kondamudi et al. | |

(Continued)

FOREIGN PATENT DOCUMENTS

DE 202025101309 U1 * 3/2025 ............. G06Q 10/20

OTHER PUBLICATIONS

"World Federation of Advertisers—about GARM "https:/Aveb.archive.org/web/20210515233852/ nttps://wfanet.org/leadership/garm/about-garm (Year:2021) (Year: 2021).*

(Continued)

*Primary Examiner* — Raquel Alvarez
(74) *Attorney, Agent, or Firm* — Baker Botts L.L.P.

(57) ABSTRACT

Computer-implemented methods provide, in various embodiments, processes that can learn from customer data stored in the data repositories of a CDP and automatically cluster customers or users based on specific characteristics, termed behaviors, and attributes to create digitally stored audience definitions or audiences, use machine learning segmentation techniques, such as unsupervised and semi-supervised K-means clustering, with the ability to adjust ML parameters to segment audiences with more context data from the end user rather than relying solely on the ML model as originally written or received from an open-source or other public library. A specified audience can then be the target of digital communications using a variety of channels or platforms. HIVE and PRESTO queries facilitate large-scale data processing in practical time.

22 Claims, 15 Drawing Sheets

(56) References Cited

U.S. PATENT DOCUMENTS

| | | | | |
|---|---|---|---|---|
| 2023/0315763 | A1 | 10/2023 | Kovachev et al. | |
| 2024/0028930 | A1* | 1/2024 | Shinde | G06Q 30/0242 |
| 2025/0165467 | A1* | 5/2025 | Zhang | G06F 16/24532 |

OTHER PUBLICATIONS

Desmet, Michael, European Extended Search Report, European Application No. 25198600.6, mailed Nov. 17, 2025, 9 pages, European Patent Office, Munich, Germany.

* cited by examiner

550

AUTO-SEGMENTATION FOR CUSTOMER DATA PLATFORMS

CROSS-REFERENCE TO RELATED APPLICATIONS

This application claims the benefit under 35 U.S.C. § 119(e) of provisional application 63/688,971, filed Aug. 30, 2024, the entire contents of which are hereby incorporated by reference for all purposes as if fully set forth herein.

TECHNICAL FIELD

One technical field of the present disclosure is computer-implemented clustering of records in large-scale digital databases using machine-learning models that implement the K-means clustering algorithm.

BACKGROUND

The approaches described in this section are approaches that could be pursued but not necessarily approaches that have been previously conceived or pursued. Therefore, unless otherwise indicated, it should not be assumed that any of the approaches described in this section qualify as prior art merely by virtue of their inclusion in this section.

Digital marketers preparing online digital advertising campaigns commonly use the segment editor of a customer data platform (CDP) or other digital advertising computer system to prepare segments. Audiences and segments are defined in terms of profiles. A profile defines a set of customers, users, user accounts, or other data associated with consumers or end users in terms of demographic attributes, transaction attributes, or technical attributes.

A segment is a portion of an audience of profiles to which digital advertising will be directed in one or more particular campaigns. A segment editor typically is a SaaS-based, online, software-implemented tool to view audience data, enter rules to define subsets of audience members, and associate the rules with a segment identifier. Some CDPs provide software features that enable automatically defining a segment, wholly or partially, using clustering techniques. For example, the K-means clustering algorithm can be programmed to determine which profiles are like others and should be clustered in a segment. However, K-means clustering can be too basic for some users and can be deficient in failing to allow a non-technical user to add business context data to guide the underlying machine-learning (ML) model to form the clusters. The result is unbalanced, non-actionable, or irrelevant audiences to the user's business context.

Furthermore, some auto-segmentation solutions require using either Spark or Python for computation, as well as Jupyter notebooks or a similar visualizable rendering environment. Executing typical Python implementations of the K-means algorithm over large datasets can require heavy computing resources. This approach requires a complex processing architecture, including dedicated Spark or Python compute clusters. Notebook-based visualizations also typically are difficult for non-technical users.

Based on the foregoing, the referenced technical fields have developed an acute need for improved ways to automatically segment, or support segmentation, of audiences, using an analytics framework available after an ML model run that enables users to identify the distinctive features and business meaning of each audience, to create actionable and personable segments for each one.

SUMMARY

The appended claims may serve as a summary of the invention.

DETAILED DESCRIPTION

Figure 1:
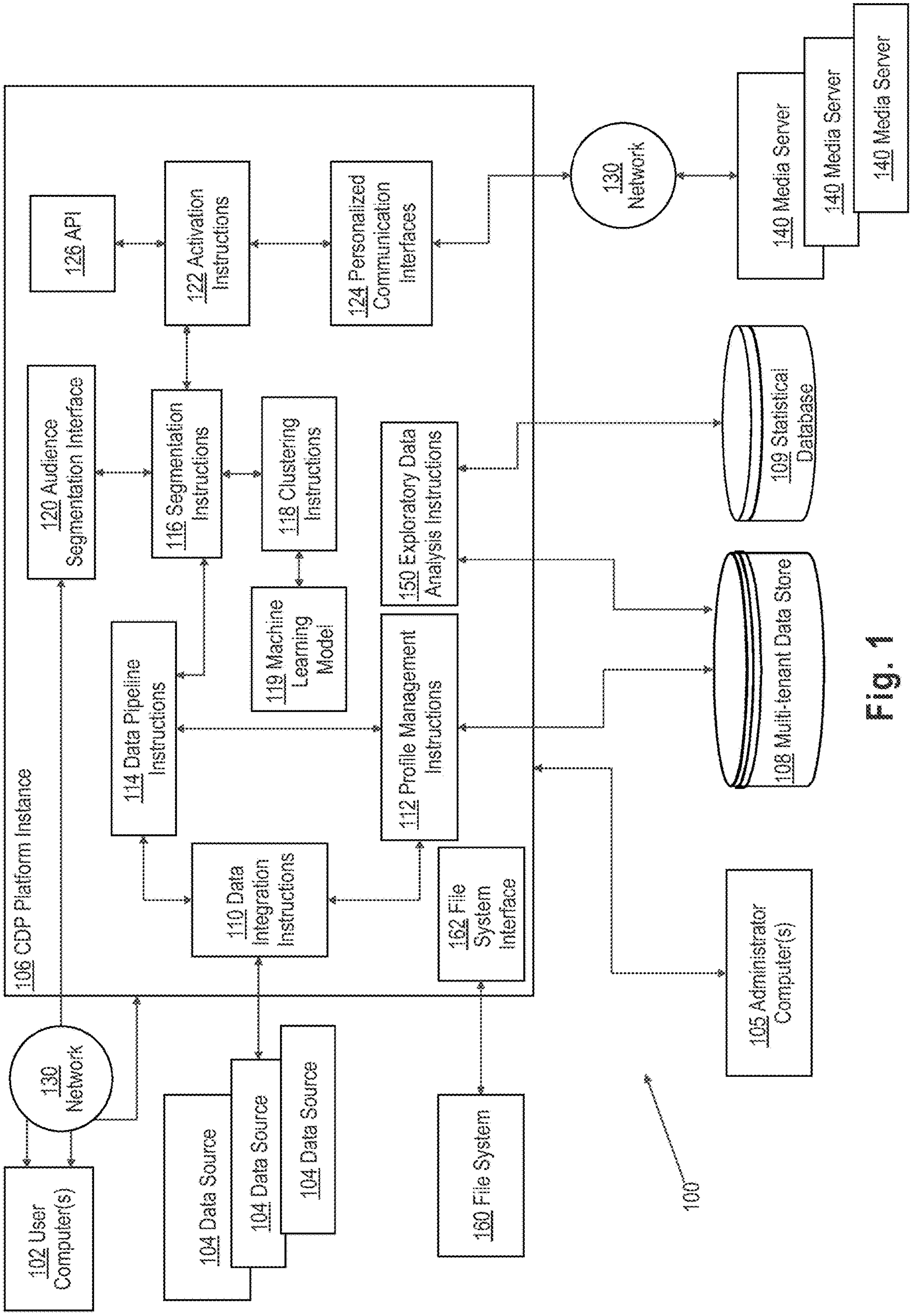
FIG. 1 illustrates a distributed computer system showing the context of use and principal functional elements with which one embodiment could be implemented.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The text of this disclosure, in combination with the drawing figures, is intended to state in prose the algorithms that are necessary to program the computer to implement the claimed inventions at the same level of detail that is used by people of skill in the arts to which this disclosure pertains to communicate with one another concerning functions to be programmed, inputs, transformations, outputs and other aspects of programming. That is, the level of detail set forth in this disclosure is the same level of detail that persons of skill in the art normally use to communicate with one another to express algorithms to be programmed or the structure and function of programs to implement the inventions claimed herein.

This disclosure may describe one or more different inventions, with alternative embodiments to illustrate examples. Other embodiments may be utilized, and structural, logical, software, electrical, and other changes may be made without departing from the scope of the particular inventions. Various modifications and alterations are possible and expected. Some features of one or more of the inventions may be described with reference to one or more particular embodiments or drawing figures, but such features are not limited to usage in the one or more particular embodiments or figures with reference to which they are described. Thus, the present disclosure is neither a literal description of all embodiments of one or more inventions nor a listing of features of one or more inventions that must be present in all embodiments.

Headings of sections and the title are provided for convenience but are not intended to limit the disclosure in any way or as a basis for interpreting the claims. Devices described as in communication with each other need not be in continuous communication with each other unless expressly specified otherwise. In addition, devices that communicate with each other may communicate directly or indirectly through one or more intermediaries, logical or physical.

A description of an embodiment with several components in communication with one other does not imply that all such components are required. Optional components may be described to illustrate a variety of possible embodiments and to illustrate one or more aspects of the inventions fully. Similarly, although process steps, method steps, algorithms, or the like may be described in sequential order, such processes, methods, and algorithms may generally be configured to work in different orders unless specifically stated to the contrary. Any sequence or order of steps described in this disclosure is not a required sequence or order. The steps of the described processes may be performed in any order practical. Further, some steps may be performed simultaneously. The illustration of a process in a drawing does not exclude variations and modifications, does not imply that the process or any of its steps are necessary to one or more of the invention(s), and does not imply that the illustrated process is preferred. The steps may be described once per embodiment but need not occur only once. Some steps may be omitted in some embodiments or occurrences, or some steps may be executed more than once in a given embodiment or occurrence. When a single device or article is described, more than one device or article may be used in place of a single device or article. Where more than one device or article is described, a single device or article may be used instead of more than one device or article.

The functionality or features of a device may be alternatively embodied by one or more other devices that are not explicitly described as having such functionality or features. Thus, other embodiments of one or more inventions need not include the device itself. Techniques and mechanisms described or referenced herein will sometimes be described in singular form for clarity. However, it should be noted that particular embodiments include multiple iterations of a technique or manifestations of a mechanism unless noted otherwise. Process descriptions or blocks in figures should be understood as representing modules, segments, or portions of code, including one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved.

1. General Overview

In one embodiment, the disclosure provides a customer auto-segmentation process and visual dashboard compatible with a CDP. The disclosed techniques provide a highly scalable clustering solution that enables users to prioritize customer characteristics, add business context to the ML model, and analyze outputs to create actionable audiences. One embodiment also enables scoring new users in near real-time.

In an embodiment, non-technical users can define the priority of certain customer characteristics and behaviors that the users want the ML model to focus on when building clusters. In an embodiment, an analytics framework is available after each ML model run and enables users such as marketers or business decision-makers to identify the distinctive features and business meaning of each audience and create actionable and personalized marketing strategies for each one.

One embodiment is implemented as a workflow executable with a CDP and using Presto and Hive functions to ensure that compute-intensive data processing executes efficiently, even with large datasets, using the distributed computing capabilities of Hive and/or Hadoop. After data preparation operations, an embodiment can use automated statistical analysis to select the minimal required dataset sample from the larger population that is still a robust representation of the entire population; thereafter, a Python-based K-Means model can be trained quickly and efficiently on the most meaningful data, filtering out noise.

Embodiments can be implemented using Python libraries. In one embodiment, a Python library implements a semi-supervised K-Means clustering model, allowing non-technical users to specify a list of customer characteristics and behaviors they want the model to focus on when building clusters. In an embodiment, the library is programmed to write standardized model parameter outputs into a CDP's data repository, thus saving the custom model parameters in a tabular format for efficient scoring. This approach avoids the drawbacks associated with pickle file storage as used in some existing CDPs.

In an embodiment, the library can score new users in near-real time in small batches, using only SQL-based code with Presto/Hive functions that run directly on the table into which new data is streamed. This approach removes the need for storing a Python pickle file and accessing a Python environment and API to load the pickle file and score new users whenever the system needs to re-score a population. The inventors conceived the foregoing approach in an inventive moment, and no other K-Means cluster scoring in SQL is believed to exist elsewhere.

In an embodiment, the library is programmed to automatically write standardized tables in the same database that stores important aggregated analytical data from the model, such as cluster distribution, feature importances, SHAP values of the features for each cluster, feature compactness, and categorical feature summary data. These unified tables support an automated visual dashboard that allows non-technical users to identify business definitions of an audience and form actionable insights and personalized marketing strategies for each automatically generated segment.

2. Structural & Functional Overview

Embodiments provide computer-implemented processes that are programmed to effectively learn from customer data stored in the data repositories of a CDP and automatically cluster customers or users based on specific characteristics, termed behaviors, and attributes to create digitally stored audience definitions or audiences. A specified audience can then be the target of digital communications using a variety of channels or platforms. Embodiments use machine learning segmentation techniques, such as unsupervised and semi-supervised K-means clustering, with the ability to adjust ML parameters to segment audiences with more context data from the end user, rather than relying solely on the ML model as originally written or received from an open source or other public library.

Embodiments can automate segment building and make segments available in an audience editor or other facility of a CDP for activation; receive input from the end user specifying custom weight values such as (high, medium, and low) to prioritize attribute data specifying customer behaviors or attributes, thereby causing the ML model to focus on the attribute data having higher weight values when segments are automatically generated; provide easy-to-interpret graphical visualizations in a user interface to help the user understand the characteristics of the different audiences that the ML model generates; provide statistical analysis, data normalization, and K-means clustering a population; and divide the customer base represented in customer data of a CDP data repository into specified categories that are relevant for communications purposes, such as DEAL-SEEKER, QUICK-BUYER, COMPULSIVE BROWSER, HIGH-SPENDER, or others.

With these functions and operations, embodiments offer several practical data processing applications. Embodiments enable end users to display data identifying the distinct user groups that form naturally in a customer base, and their characteristics, given the attributes and behaviors that are available in the customer data of the CDP repository. Embodiments enable end users to target each audience differently across channels to personalize the communications that customers within an audience receive based on the behavioral patterns of those customers, thereby increasing the likelihood that those customers will further interact with other systems. Embodiments enable sending special-purpose digital communications to a specified segment of the audience. Embodiments enable using cluster labels to train other ML models, such as propensity, CLTV, or next-best-action models. Embodiments can be programmed to export specified segments formed by the clustering techniques described herein to other systems for use in those systems.

This disclosure is directed to persons having a working understanding of Presto, Hive, DigDag, Python, and data science methods applicable to machine learning models.

2.1 Distributed Computer System Example

FIG. 1 illustrates a distributed computer system showing the context of use and principal functional elements with which one embodiment could be implemented. In an embodiment, a computer system 100 comprises components implemented partially by hardware at one or more computing devices, such as one or more hardware processors executing stored program instructions stored in one or more memories for performing the functions described herein. In other words, all functions described herein are intended to indicate operations performed using programming in a special or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1 illustrates a distributed computer system showing the context of use and principal functional elements with which one embodiment could be implemented. In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer in various embodiments. FIG. 1 illustrates only one of many possible arrangements of components configured to execute the programming described herein. Other arrangements may include fewer or different components, and the division of work between the components may vary depending on the arrangement.

FIG. 1, and the other drawing figures and all of the description and claims in this disclosure, are intended to present, disclose, and claim a technical system and technical methods in which specially programmed computers, using a special-purpose distributed computer system design, execute functions that have not been available before to provide a practical application of computing technology to the problem of automatic audience clustering and segmentation in a CDP. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In an embodiment, a plurality of user computers 102, data sources 104, administrator computers 105, multi-tenant data store 108, statistical database 109, and network 130 are communicatively coupled to a customer data platform (CDP) instance 106. Each of the user computers 102 and administrator computers 105 comprises a desktop computer, laptop computer, tablet computer, smartphone, or other computing device and may be coupled directly or indirectly via one or more network links. User computers 102 can be associated with end users who interact with programs of CDP instance 106 to generate metadata for database tables and/or generate or view visualizations of the metadata in the manner described in other sections. Administrator computers 105 can be associated with other end users who are responsible for configuring, managing, or administering the CDP instance 106.

Each of the data sources 104 can be a networked, digitally stored data repository of records of transactions, communications, impressions, or other data concerning an interaction of an enterprise with customers of the enterprise. The data sources 104 are conceptually external to the CDP instance 106 and can be associated with an enterprise with a customer relationship with thousands to millions of customers. Examples include retailers or distributors of goods, service providers, or consolidators. In one example, a data source 104 can hold records concerning sales of goods of an enterprise and customers such as orders, shipping data, metadata relating to how customers located or interacted with the enterprise, media placement data, and other commercial records.

In an embodiment, the multi-tenant data store 108 is a large-scale data repository that stores records that the CDP instance 106 manages and uses to conduct operations for multiple different enterprises that have a customer relationship with the owner or operator of the CDP instance 106. Thus, the CDP instance 106 can provide services to a large number of different enterprises, and all data created by the CDP platform for all enterprises can be centrally stored in multi-tenant data store 108, under the control of security algorithms that block or prevent user computers 102 of one enterprise from accessing, using, or viewing the data of a different enterprise. In one implementation, data store 108 can be an APACHE HADOOP cluster of repositories or databases.

In an embodiment, the statistical database 109 is a digital data repository programmed to store tables of metadata concerning the data sources 104 and data to support visualization operations that the CDP instance 106 generates, as further described in other sections herein. Broadly, as further described in other sections, the CDP instance 106 is programmed to read data sources 104, generate metadata describing the data in the data sources, store the metadata in statistical database 109, and generate and cause displaying a plurality of different visual representations of the metadata on computer display devices with graphical user interfaces. In some embodiments, the statistical database 109 can be integrated with the multi-tenant data store 108.

In an embodiment, network 130 can be one or more local area networks, wide area networks, or internetworks, using any wired or wireless, terrestrial or satellite data links. In an embodiment, the media servers 140 comprise networked computers that can be called or instructed, from CDP instance 106, to cause dispatching communications to user computers 102 or other entities in the manner described in other sections herein.

In an embodiment, the CDP instance 106 comprises sequences of executable stored program instructions that are organized in the functional units, packages, and elements shown in FIG. 1 and executed or hosted using one or more virtual computing instances in a private data center, public datacenter, and/or cloud computing facilities. In an embodiment, the CDP instance 106 can include data integration instructions 110, which are coupled to data sources 104 as inputs and also coupled to data pipeline instructions 114 and profile management instructions 112, the data pipeline instructions and profile management instructions being programmed to interoperate; segmentation instructions 116 coupled to the data pipeline instructions 114, to clustering instructions 118, and an audience segmentation interface 120; activation instructions 122, which are coupled to segmentation instructions 116 and clustering instructions 118 as well as to personalized communication interfaces 124 and an application programming interface (API) 126.

Segmentation instructions 116 are programmed to execute automatic segmentation functions based on profiles in multi-tenant data store 108 as further described in other sections herein, interoperating with the clustering instructions 118, which can implement or include a trained machine learning model 119. Example source files for an embodiment are shown in the APPENDIX at the end of this disclosure. In the example files and all drawing figures and text of this disclosure, example filenames and table names may be given, but the present description and claims are not limited to any specific names given. Names and labels are given only as examples and to distinguish one thing from another. Embodiments of the disclosure or claims can use functionally equivalent code, scripts, functions, processes, tables, or data while using different names or labels.

To support these functions, this disclosure presumes that one of the user computers has configured the multi-tenant data store 108 with at least one parent segment with sufficient attributes and aggregated behaviors added to the parent segment. Segmentation instructions 116 are coupled to an audience segmentation interface 120 programmed to interact with user computers 102 to define audience segments and advertising or marketing campaigns. While certain embodiments can be used in advertising technology applications, the techniques described and claimed herein are not limited to that context and are not intended to perform business functions.

The foregoing elements are programmed, broadly, to obtain data from the data sources 104; process the data via data integration instructions 110, for example to normalize and/or clean the data for storage in multi-tenant data store 108; to further process the data via data pipeline instructions 114 according to a programmed workflow or pipeline of steps under direction of the profile management instructions 112; to use segmentation instructions 116 and audience segment definitions received from audience segmentation interface 120, interoperating with clustering instructions 118 and machine learning model 119, to automatically create and store digital definitions of audience segments for evaluation, assessment, and/or transmitting communications to audiences of customers or other users; to communicate the segments and campaigns to activation instructions 122, which are programmed to activate campaigns on a plurality of different communication channels such as email, text messaging, or automatic calls; and to dispatch individual communications of a campaign via personalized communication interfaces 124 toward media servers 140 for communication to customers or users. Activations can also be initiated via calls to the API 126 from external systems.

The CDP instance 106 of FIG. 1 further comprises exploratory data analysis (EDA) instructions 150 which are programmed, in general, to obtain data from multi-tenant data store 108 for tables and columns represented in the data store that were created and stored based on the data sources 104, to generate metadata describing the tables and columns via aggregation algorithms and statistical algorithms, and to generate presentation instructions that are programmed to cause displaying graphical visualizations of the metadata on computer display devices having graphical user interfaces. In an embodiment, EDA instructions 150 are coupled to a statistical database 109 to store metadata describing the tables and columns of multi-tenant data store 108.

In an embodiment, EDA instructions 150 are programmed to use PRESTO and HIVE functions and operations that can loop through a list of database tables in multi-tenant data store 108 and extract or calculate statistical values from each table and column, using aggregation in some cases, potentially reducing tables of 100,000,000 rows or more into far smaller tables, which can be as small as thousands of rows depending on the tables and columns that the user computer 102 requests to explore, of condensed descriptive statistics. The resulting smaller tables can be stored in statistical database 109 and used in an in-memory data model that powers a visual dashboard and other graphical visualizations. As later sections will show, EDA instructions 150 can be programmed to generate graphical visualizations and interface elements that can be used with user computers 102 associated with non-technical users. Execution of EDA instructions 150 can be controlled by a configuration file that specifies data to inspect, the minimum requirements of data to trigger output or find PII, and aggregate or find columns that are in the wrong format. EDA instructions 150 can be programmed with filters to exclude data from tables or columns in metadata computation.

CDP platform instance 106 may further comprise a file system interface 162 programmed to facilitate accessing a file system 160 and digitally stored files in the file system, such as script code, libraries, programs, and one or more files containing queries, dictionaries, and orchestration files. The file system 160 can be integrated with the CDP platform instance 106, the multi-tenant data store 108, or an external system, service, or resource. For example, file system 160 can comprise a third-party source code repository system such as GITHUB or BITBUCKET. When a third-party system is used, the file system interface 162 can be programmed to manage and present keys, passwords, passcodes, or other digital credentials that enable the CDP platform instance 106, or any element of it, to access and use files that are stored in the file system 160.

The CDP platform instance 106 can host or execute other stored program components that provide interfacing and foundation services. For example, the CDP platform instance 106 can host an operating system, system libraries, a web server, and web application infrastructure that enable user computers 102 to access and invoke the audience segmentation interface 120, invoke the segmentation instructions 116, and/or invoke other functional elements using HTTP-based browsing requests. The file system 160 can expose a separate web server for independent access using HTTP-based browsing requests.

File system 160 can host and store utility parameter files, utility scripts, and orchestration files, each of which is structured to support the execution of CDP platform instance 106 by specifying queries to accomplish transformations, script code for some transformations, dictionary data such as lists of values, other internal configuration, and orchestration or workflow definitions.

The foregoing describes selected structural elements and operations of CDP instance 106 in one embodiment. A complete description of all possible operations and uses of CDP instance 106 is beyond the scope of this disclosure and would obscure the focus of this disclosure. An example of a CDP instance 106 is the TREASURE DATA platform commercially available from Treasure Data, Inc. and Treasure Data K.K., which is fully described and documented at the time of this writing in publications available at the domain "treasuredata" in the COM global top-level domain of the World Wide Web. Those using this disclosure are presumed to have familiarity with programming, architecting, and implementing CDP platforms of the type described in the preceding publications. Creating a working implementation based on this disclosure may also involve having knowledge and skill with PRESTO, HIVE, DIGDAG from Treasure Data, and TREASURE INSIGHTS from Treasure Data.

2.2 Technical Implementation Summary

In an embodiment, the segmentation instructions 116 are configured as a workflow that the CDP platform instance can execute based on specified configuration files. In an embodiment, user computer 102 provides input to configure certain YAML (*.yml) files in a CONFIG folder and a structured definition (CONFIG.JSON) file in a main project folder. After those steps, the user computer can signal the CDP platform instance 106 to execute the segmentation instructions 116 to automatically construct segments.

In one embodiment, user computer 102 accesses and updates the following YAML files to configure the workflow: config/input_params.yml;

2.2.1 config/input_params.yml

The specified file controls parameters that may be applied globally across most data sources and processes of the workflow. TABLE 1 shows an example:

TABLE 1

```
###### GLOBAL PARAMS ######
api_endpoint: 'api.treasuredata.com'
sink_database: ml_prod                                    # all output
tables will go to this database
create_dashboard: yes                                 # whether to create
Treasure Insights dashboard
model_config_table: datamodel_build_history              # table in
database that has model build history
cleanup_temp_tables: no
retrain_model: no
##### DATA PARAMS #####
input_database: ml_prod                                 # default master
segment database
input_table: agg_attr_derived_attributes_final          # default customer
table with intended attributes and behaviors
user_id: td_canonical_id                                # default user
identifier
excl: 'time'                                            # in regex
notation, the columns to exclude from segmentation
semi_supervised: 'yes'                                    # 'yes' or 'no',
whether to run semi-supervised segmentation
prioritize:                                               # in regex
notation, columns to prioritize for semi-supervised segmentation
  high: 'next_best_|rfm_'
  med: 'browsing|days_since'
  low: 'none'
  high_coeff: 10                                          # corresponding
coefficient levels (defaults are 10, 6, 4)
```

TABLE 1-continued

```
  med__coeff: 6
  low__coeff: 4
##### MODEL PARAMS #####
k__min: 2                                   # minimum number of segments to
test
k__max: 7                                   # maximum number of segments to
test
override__k: no                             # 'no' to automatically choose best
number of clusters, int to manually select
model__sample__size: 10000                 # sample size used for model
training
final__predict__table: as__final__clusters          # K-means model final
predict table with latest labels for each user__id
##### SEGMENTATION PARAMS #####
create__segments: no                        # whether segments are to be
created in Audience Studio
label__logic:                               # after segmentation is run, the
business labels given to each cluster
  - cluster: 0
   label: 'Non Buyers Organic Search Engagement'
  - cluster: 1
   label: 'Non Buyers Omni-Channel Engagement'
  - cluster: 2
   label: 'Buyers Omni-Channel Engagement'
##### PRESTO SCORING PARAMS #####
make__predictions: 'no'
input__customers__table: agg__attr__derived__attributes__test          #
cdp__audience__.customers table that needs to be updated with latest
user labels
data__transform__table: as__data__processing          # table that stores
feature engineering history
model__params__table: as__model                       # table that K-means
model params for scoring new users
##### TEMP TABLES: DO NOT EDIT! ##########
temp__tables:
  - as__feature__importances
  - as__histograms
  - as__shap
```

2.2.2 DIGDAG Files

In one embodiment, the segmentation instructions 116 include the following DigDag files:

- ml_autosegmentation_launch.dig-base workflow that includes all processes
- ml_autoseg_premodel.dig-workflow that handles data pre-processing and sampling
- ml_autoseg_py.dig-workflow that runs clustering via Python custom scripting

2.2.3 Python & Key SQL Files Summary

In one embodiment, the segmentation instructions 116 include the following Python files:

- python_files/autosegment_script.py—Python script that creates and runs the segmentation model
- sql/custom_base_table.sql—SQL script that runs at the beginning of ml_autoseg_premodel.dig and creates a custom base table by joining multiple tables and filtering customers.

2.2.4 Table Outputs

In one embodiment, executing the foregoing as the segmentation instructions 116 causes creating and storing the following output tables in the multi-tenant data store 108:

- as_base_table—base table with the sample data used for training the clustering model
- as_dash_histograms—table with aggregated data distributions for dashboard output
- as_dash_compactness—table with feature compactness information and model SHAP values for use in dashboard output
- as_data_processing—table with data preprocessing steps for recreating preprocessing on new data
- as_eda—table with feature summary stats to ensure that sampling is representative of the population, used for the dashboard output
- as_feature_importances—table with feature importance statistics for dashboard output
- as_final_clusters—final model output table with user_id and custom business cluster label
- as_labels—mapping table for cluster number to business labels
- as_model—table with model parameters for running predictions on new data
- as_model_params—table with modeling parameters for use in dashboard output
- as_shap—table with model SHAP values

2.2.5 Workflow Overview

Label Check, Predictions, and Audience Studio Segment Build. In an embodiment, the Build sub-process described in this section executes first to determine whether business labels have been updated in the cluster_labels parameter in input_params.yml. If non-default labels are set, labels are added to relevant tables, and the dashboard updates with user-defined business labels. In an embodiment, the sub-process is not executed in the workflow's first run. Instead, the retrain_model parameter is set to YES because there are no existing business labels or segments to be built on the first run. TABLE 2 shows an example of setting labels in a YML file.

TABLE 2

```
create__segments: yes
label__logic: # after segmentation is run, the business labels
given to each cluster
   - cluster: 0
   label: 'Evening Users'
   - cluster: 1
   label: 'Overnight / Organic Search Users'
   - cluster: 2
   label: 'Overnight / Client Domain Organic Visitors'
   - cluster: 3
   label: 'Afternoon Users'
- cluster: 4
label: 'Morning Users'
```

Predictions. The K-Means model is not intended for frequent retraining. Therefore, as new users are added to the database or as users' behaviors and attributes change, a predictions sub-process enables fitting any new or updated users to existing created segments. The predictions sub-process executes if the make_predictions parameter is set to YES. To define the set of customers to score, only the input_customers_table is configured. TABLE 3 shows an example of relevant parameters.

TABLE 3

```
make__predictions: 'yes'
input__customers__table: gldn.customers          # table that needs to be
updated with latest user labels
data__transform__table: as__data__processing     # table that stores feature
engineering history
model__params__table: as__model                  # table that holds K-means model
params for scoring new users
```

Figure 2A:
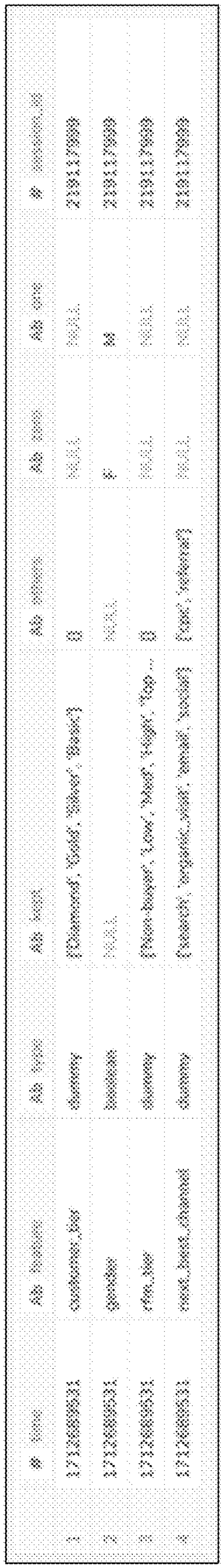
FIG. 2A illustrates an example table of four rows, with columns for time, feature, feature type, kept attribute, others attribute, zero attribute, one attribute, and session identifier.

This part of the workflow also creates segments for Audience Studio if the create_segments parameter is set to YES. In an embodiment, to negate the need for saving the clustering model in networked storage like S3, the workflow is programmed to save model parameters so that the scoring can be fully executed in Presto. The table as_data_processing contains data preparation information for any raw data streamed in, including whether the feature is categorical or continuous and, if categorical, what values are kept and what minatory categories are re-categorized as "other." FIG. 2A illustrates an example table of four rows, with columns for time, feature, feature type, kept attribute, others attribute, zero attribute, one attribute, and session identifier.

Figure 2B:
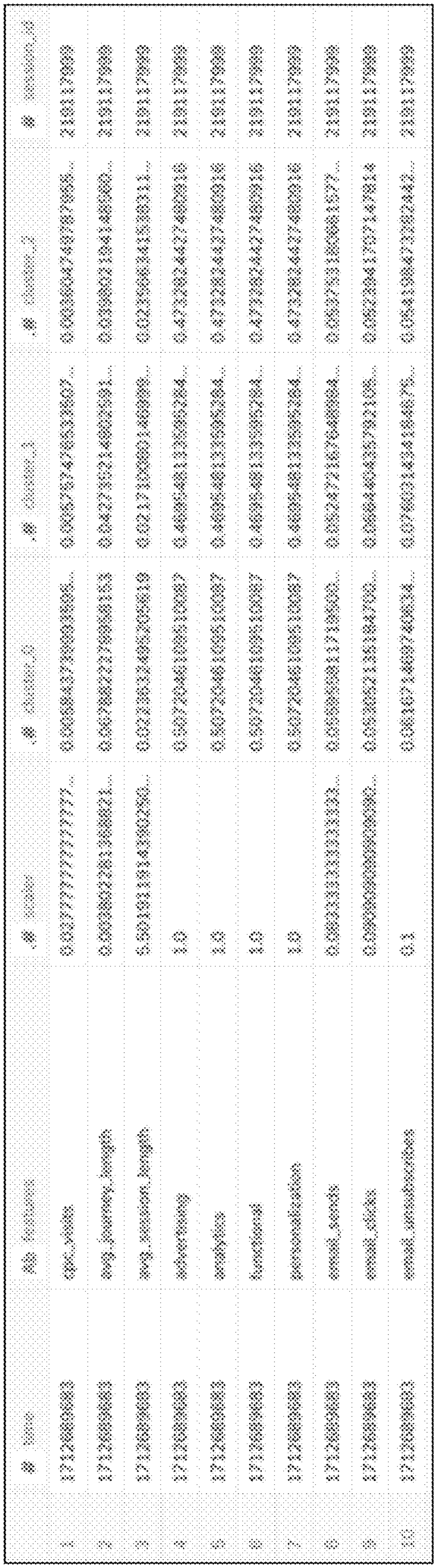
FIG. 2B illustrates an example of a table of ten rows showing attributes for time, features, scale value, cluster values, and session identifier.

The table as_model comprises scaling values, including prioritization and centroids for the last-run clustering model. Using a nearest-neighbor calculation, the segmentation instructions 116 are programmed to scale the raw data and calculate which cluster each new data point should belong to based on which it is closest to. Experimentation has shown this approach consistent with the Python model's output. FIG. 2B illustrates an example of a table of ten rows showing attributes for time, features, scale value, cluster values, and session identifier.

In an embodiment, the prediction process executes as follows.

1. Segmentation instructions 116 are programmed to query data for user records that need predictions. Any null values are coalesced using the same query that was used to coalesce null values in the training data. This creates the table as_predictions_base.
2. Segmentation instructions 116 are programmed to execute feature transformations for categorical variables based on the information stored in the as_data_processing table, including creating dummy variables, one-shot encoding, and re-categorizing minority values as "Other."
3. Continuous or numeric features are transformed using the "scaler" column in the as_model table, which scales each feature to its corresponding MinMax-scaled value based on the training data and also includes scaling by the prioritization coefficient if it was used on training data.
4. With data scaled and pre-processed to match the data transformation executed over the training data, predictions for each user record execute. Prediction comprises finding which cluster centroid value, which is characterized by the values in the corresponding column of the as_model table, is closest to each new user, now stored in an as_predict_transformed_features table. The following queries show how nearest-neighbor calculation is done within Presto. QUERY 1 retrieves cluster centroid values from as_model and stores the values in the table td.last_results

QUERY 1

```
WITH T1 AS (
SELECT
   ARRAY__JOIN(transform(ARRAY__AGG(column__name), x -> 'T3.' || x),
', ') as cluster__cols
FROM information__schema.columns
WHERE table__schema= '${sink__database}'
and table__name='${model__params__table}'
```

-continued

QUERY 1

```
AND REGEXP__LIKE(column__name, ‘cluster__’)
)
,
T2 AS (
SELECT
   features as quant__features,
   CONCAT(““, features, ””) AS quant__feat__quotes
FROM ${model__params__table}
)
SELECT
   (SELECT cluster__cols FROM T1) as cluster__cols,
   array__join(array__distinct(filter(array__agg(REGEXP__REPLACE(quan
t__features, ‘[– ]’, ‘’)), x ->x IS NOT NULL)), ‘, ’) AS
quant__features,
   array__join(array__distinct(filter(array__agg(REGEXP__REPLACE(quan
t__feat__quotes, ‘[– ]’, ‘’)), x -> x IS NOT NULL)), ‘, ’) AS
quant__feat__quotes
FROM T2
```

QUERY 2 is programmed to explode the data such that each user's feature data is in a single column that can be matched with the centroid data from each cluster.

QUERY 2

```
-- @TD distribute strategy: aggressive
WITH T1 AS (
      SELECT
      ${user__id},
      ARRAY [${td.last__results.quant__feat__quotes}] as features,
      ARRAY [ ${td.last__results.quant__features}] as vals
      FROM as__predict__transformed__features
      ),
T2 AS (
      SELECT ${user__id}, feature, val
      FROM T1
      CROSS JOIN UNNEST(features, vals) AS t (feature, val)
   )
   SELECT T2.*,
      T3.scaler,
      ${td.last__results.cluster__cols}
   FROM T2
   JOIN ${model__params__table} T3
   ON T2.feature = T3.features
```

With the exploded data stored in the table as_features_exploded, the query can be programmed to compute the distance between each user and each cluster centroid. QUERY 3 is programmed to create the query syntax.

QUERY 3

```
SELECT
   ARRAY__JOIN(TRANSFORM(ARRAY__AGG(column__name),
   x –>
   CONCAT(‘SQRT(SUM(power((val*scaler) - ’, x, ‘, 2)))’)),
‘, ’)
   as rmse__syntax
FROM information__schema.columns
WHERE table__schema= ‘${sink__database}’
and table__name=‘${model__params__table}’
AND REGEXP__LIKE(column__name, ‘cluster__’)
```

The next query uses the syntax to find the vector differences, expressed as “diffs” in the query, per user per cluster centroid, and uses ARRAY_MIN to find the predicted cluster.

QUERY 4

```
WITH T4 AS (
SELECT ${user__id},
   ARRAY [${td.last__results.rmse__syntax}] as diffs
FROM as__features__exploded
GROUP BY 1
   )
SELECT T4.*,
   array__position(diffs, array__min(diffs)) - 1 as cluster
FROM T4
```

QUERY 5 shows the same query, with the query syntax inserted for clarity. The number of clusters also is accounted for dynamically. The final table can be used in an audience editor like Treasure Data Audience Studio or joined to any other customer attribute table for analysis.

QUERY 5

```
WITH T4 AS (
      SELECT
      td__canonical__id,
      ARRAY [SQRT(SUM(power((val*scaler) - cluster__0, 2))),
      SQRT(SUM(power((val*scaler) - cluster__1, 2))),
      SQRT(SUM(power((val*scaler) - cluster__2, 2)))] as diffs
      FROM as__features exploded
      GROUP BY 1
      ),
   MAP as (
      SELECT DISTINCT cluster, cluster__label
      FROM as__final__clusters
      ),
   T5 AS (
      SELECT T4.*,
      array__position(diffs, array__min(diffs)) - 1 as cluster
      FROM T4
   )
   SELECT T5.td__canonical__id, T5.cluster, MAP.cluster__label
   FROM T5
   OIN MAP ON T5.cluster = MAP.cluster
```

Figure 3:
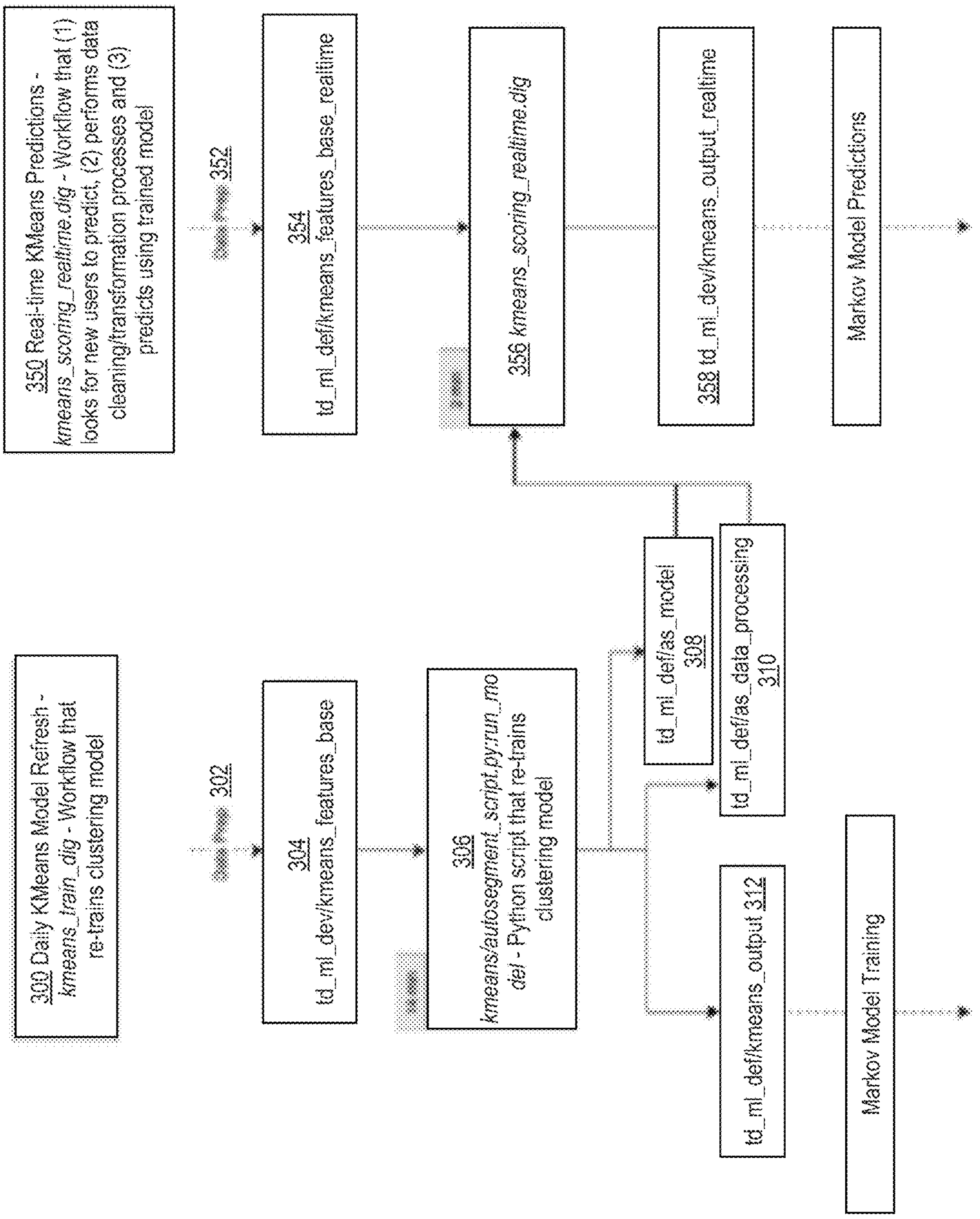
FIG. 3 illustrates a data flow and program flow design for scoring new users in near real-time after training the machine learning model.

FIG. 3 illustrates a data flow and program flow design for scoring new users in near real-time after training the machine learning model. FIG. 3 and each other flow diagram herein are intended as an illustration of the functional level at which skilled persons, in the art to which this disclosure pertains, communicate with one another to describe and implement a computer-implemented method, as described further herein and/or algorithms using programming. The flow diagrams are not intended to illustrate every instruction, method object, or sub-step that would be needed to program every aspect of a working program but are provided at the same functional level of illustration that is normally used at the high level of skill in this art to communicate the basis of developing working programs.

FIG. 3 illustrates a first workflow 300 configured or programmed to re-train a K-means clustering model and a second workflow 350 configured or programmed to execute real-time K-means predictions. The first workflow 300 can execute under the control of a DigDag file or script having script commands that correspond to the functions described herein for the workflow. In an embodiment, as previously described, one or more data preparation operations 302 results in creating and storing a kmeans_features_base table 304. An auto-segmentation function 306, which can be implemented using a Python script, executes to re-train a clustering model. Output tables include the as_model table 308, as_data_processing table 310, and kmean_output table 312. Optionally, Markov model-based training can be executed afterward. In one embodiment, the auto-segmentation function 306 can use the following Python script:

```
import os
import sys
td__api__key = os.environ['td__api__key']
td__api__server = os.environ['td__api__server']
session__id = os.environ['session__id']
sink__database = os.environ['sink__database']
input__table = os.environ['input__table']
final__cluster__table = os.environ['final__cluster__table']
user__id = os.environ['user__id']
os.system(f"{sys.executable} -m pip install td-ml-
autosegmentation")
os.system(f"{sys.executable} -m pip install pandiet")
os.system(f"{sys.executable} -m pip install faiss-cpu")
os.system(f"{sys.executable} -m pip install shap")
from td__ml__autosegmentation import *
excl = os.environ ['excl']
semi__supervised = os.environ['semi__supervised']
if semi__supervised == 'yes':
   prioritize = {'high': os.environ['pr__high'], 'med':
os.environ['pr__med'],
            'low': os.environ['pr__low'], 'high__coeff':
os.environ['prc__high'],
            'med__coeff': os.environ['prc__med'], 'low__coeff':
os.environ['prc__low']}
else:
   prioritize = {'high': "", 'med': "", 'low': "", 'high__coeff':
1,
            'med__coeff': 1, 'low__coeff': 1}
k__min, k__max = int(os.environ['k__min']), int(os.environ['k__max'])
override__k = os.environ['override__k']
table__query = f"SELECT * FROM {input__table}"
client = pytd.Client(apikey=td__api__key, endpoint=td__api__server,
database=sink__database)
df = get__table(input__table, sink__database, td__api__key,
td__api__server)
df = Reducer( ).reduce(df, verbose=True)
def run__model(df=df, sink__database=sink__database, user__id=user__id,
excl=excl, prioritize=prioritize, k__min=k__min,
        k__max=k__max, override__k=override__k, client=client):
   ### getting optimal k
   data, data__clean, data__dict, scaler = column__clean(df, user__id,
excl, semi__supervised, prioritize)
   k__search = score__k(data, k__min, k__max, plot=False)
   if override__k != 'no':
      best__k = int(override__k)
   else:
      best__k = k__search['best__k']
   ### cluster & get metrics
   data, data__clean, model = cluster(data, data__clean, best__k,
user__id, model='kmeans')
   col__names = data.drop('cluster', axis=1).columns
   df, out = score__clusters(data, data__clean, data__dict)
```

-continued

```
   rf__impt, shap = get__fi(data, client=client, plot=False)
   ### save tables
   # final table with user__id + cluster
   final__table =
data__clean[['cluster']].reset__index(drop=False).drop__duplicates( )
   final__table['cluster__label'] =
final__table['cluster'].map(lambda x: 'cluster__'+str(x))
   # table with data preprocessing rules
   ddt = process__data__dict(data__dict)
   # table with feature importances
   all__importances = impt__df(out, rf__impt, k__search, k__min=k__min)
   # model params
   prop =
all__importances[all__importances['kind']=='num'][['cluster',
'impt']]
   prop['prop'] = (prop['impt']/pro['impt'].sum( )).round(3)
   cluster__dist = prop[['cluster',
'prop']].set__index('cluster').to__dict( )['prop']
   output__params = {'session__id': session__id, 'semi__supervised':
semi__supervised,
            'cluster__dist': cluster__dist,
            'num__clusters':
data__clean['cluster'].nunique( ),
            **prioritize, 'excluded': excl.replace('|', ',
')}
   for k in ['high', 'med', 'low']:
      output__params[k] = output__params[k].replace('|', ', ')
   # table with modeling params (scaler and centroids)
   model__df = save__model(model, scaler, col__names,
semi__supervised, prioritize, data, ddt)
   histograms = get__histo(data__clean, all__importances, user__id,
n=50)
   for t in [final__table, ddt, all__importances, shap, model__df,
histograms]:
      t['session__id'] = session__id
   client.load__table__from__dataframe(ddt, 'as__data__processing',
writer='bulk__import', if__exists='overwrite')
   client.load__table__from__dataframe(all__importances,
'as__feature__importances__temp2', writer='bulk__import',
if__exists='overwrite')
   client.load__table__from__dataframe(shap, 'as__shap__temp',
writer='bulk__import', if__exists='overwrite')
   client.load__table__from__dataframe(final__table,
final__cluster__table, writer='bulk__import', if__exists='overwrite')
   client.load__table__from__dataframe(model__df, 'as__model',
writer='bulk__import', if__exists='overwrite')
   client.load__table__from__dataframe(histograms,
'as__histograms__temp', writer='bulk__import', if__exists='overwrite')
   client.load__table__from__dataframe(pd.DataFrame([output__params]),
'as__model__params', writer='bulk__import', if__exists='append')
   print('Memory Usage: ')
   print(memory__usage( ))
   print('Dataframe size: ';
obj__size__fmt(sys.getsizeof(data__clean)))
```

The second workflow 350 also can execute under the control of a different DigDag file or script. The second workflow 350 is programmed to identify new users to predict, perform data cleaning and transformation processes, and execute predictions using the trained model that the first workflow 300 produced. In an embodiment, one or more data preparation operations 352 create a kmeans_features_base_realtime table 354. A K-means real-time scoring function 356 then executes, producing a kmeans_output_realtime table 358. Optionally, Markov model-based predictions can execute afterward. The APPENDIX shows code that can implement these functions.

The following parameter values are established in an embodiment before running the machine learning model 119. The retrain_model parameter is set to YES to retrain the model. Otherwise, execution will update label names of cluster output tables, execute predictions, and refresh the visual dashboard. Features are added to the model before execution. In an embodiment, the file sql/custom_base_table.sql contains a query that retrieves the columns used in the model. If new features are to be added that are not in an existing base table, they can be added via the query. The "prioritize" query is also added. Three levels of prioritization can be given to features (in regular expressions), and the degree of prioritization also can be adjusted. Typically, prioritization coefficients should range from "2" to "15." The default values suggested through experimentation are (10, 6, 4) for (high, medium, low). To use these, the "semi_supervised" parameter is set to YES.

In an embodiment, the following pre-modeling processes are used.

1. To optimize for time, a sample of user data is taken from the population to train the model. With a sample size of 200,000, experimentation has shown a training time of about 15 minutes. When model performance stabilizes, the sample size can be increased using the model_sample_size parameter. To ensure a representative population, an as_eda table can compare the sample and population statistical measures of features. Averages (mean, median), standard deviation, and the CV ratio of mean divided by standard deviation are calculated.
2. To reduce null values, numerical features can be filled with zero values. A recency parameter can be imputed with a maximum+1 value of the population. Categorical features can be filled with "none."

For model execution, in an embodiment, segmentation instructions 116 are programmed with a Python custom script task to execute modeling work and produce output tables. In an embodiment, the script is programmed with three main sub-processes.

1. Further data cleaning. In an embodiment, the script executes a check to remove features that have a single unique value. Such values will not contribute to the model, and removing them improves modeling speed and efficiency. Any users that have null values after the pre-modeling imputation are also removed, as these empty values will negatively affect model performance. Data is re-weighted to reflect any prioritization.
2. Test for the best number of clusters. In an embodiment, if the override_k parameter is set to NO, the WSS and Silhouette Score metrics for different cluster values ranking from k_min to k_max are stored for analysis. The WSS and Silhouette Score metrics are described further in other sections.
3. Clustering process. Clustering executes based on the best number of clusters determined by WSS or the value of override_k. Feature importance metrics, including SHAP values, proportional importance from a random forest model, and others, are computed; examples are further described in other sections herein.

After the modeling is executed, a visual dashboard data model is created and stored in an embodiment, or if a model exists in storage, the model is updated based on new output tables resulting from model execution.

2.3 Graphical User Interface Examples

In an embodiment, after the segmentation instructions 116 execute with clustering instructions 118 and machine learning model 119 to create one or more segments, the segmentation instructions are programmed to call or signal the audience segmentation interface 120 to refresh the browser of a user computer 102. The refresh operation generates a dynamically updated web page coded using HTML, CSS, and other web programming techniques and transmits the web page source code to the user computer 102 for rendering in a browser hosted at the user computer.

Figure 4A:
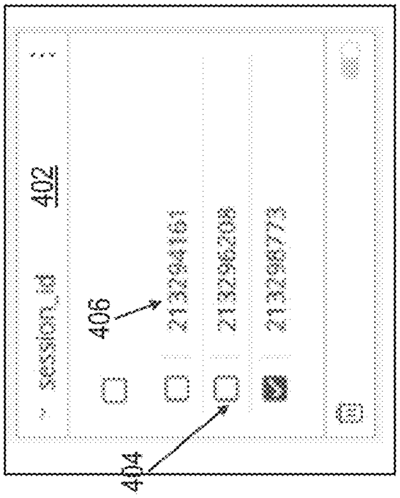
FIG. 4A illustrates an example of a session identifier filter that can be displayed in a portion of the visual dashboard as part of a filters tab.

DASHBOARD AND FILTERS. In an embodiment, the web page is formatted to render as a visual dashboard comprising a plurality of graphical displays of data relating to the segment that was generated. The visual dashboard also can comprise one or more graphical controls, programmed as interactive UI widgets. For example, FIG. 4A illustrates an example of a session identifier filter that can be displayed in a portion of the visual dashboard as part of a filters tab. In an embodiment, the filters tab provides graphical, visual access to controls which, when selected via input from user computer 102, cause the audience segmentation interface 120 to update the visual dashboard to show the relevant importance and statistical values of different clusters. Filters can also be programmed to cause the audience segmentation interface 120 to select which iteration of the model to see results from. For example, a session identifier filter 402 can be programmed to display a plurality of rows 406 showing session identifier values and corresponding UI widgets 404, such as checkboxes. Input from a user computer indicating checking a checkbox causes the audience segmentation interface 120 to update the visual dashboard to show only clusters associated with the selected session identifier.

Figure 4B:
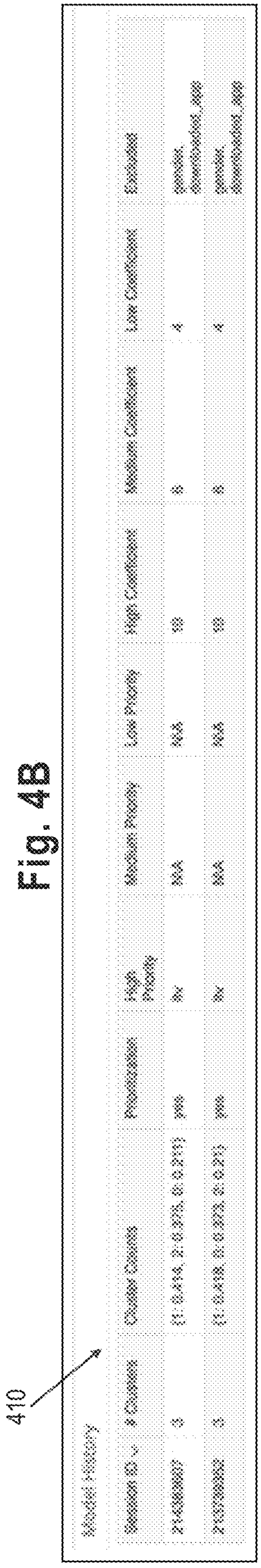
FIG. 4B illustrates an example of a model history table showing multiple session identifier values.

In an embodiment, if input from user computer 102 selects multiple different session identifiers via multiple checkboxes or other widgets, then in response, the audience segmentation interface is programmed to update the web page to show a model history table. FIG. 4B illustrates an example of a model history table showing multiple session identifier values. The model history table 410 also shows, for each session, the ML model parameters that trained the model for the corresponding session. Further, selecting multiple sessions causes all other dashboard widgets, as further described, to automatically aggregate data over the multiple model runs corresponding to the session identifiers.

Figure 5A:
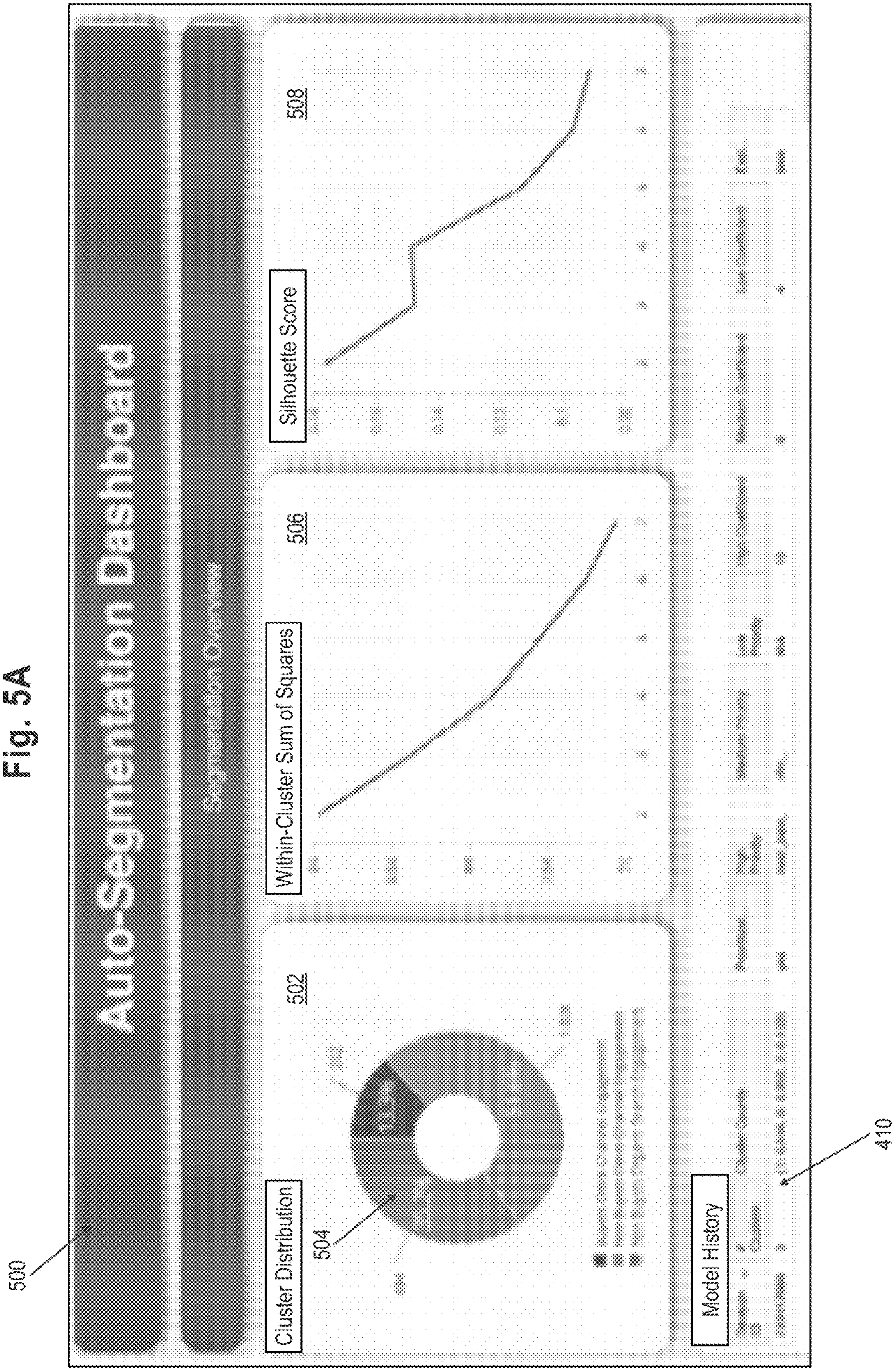
FIG. 5A illustrates an example of a portion of a visual dashboard that the segmentation interface can generate.

CLUSTER DISTRIBUTION AND SCORING. FIG. 5A illustrates an example of a portion of a visual dashboard that the segmentation interface can generate. In an embodiment, an auto-segmentation dashboard comprises multiple sets of visual graphs and charts so that input from a user computer 102 to scroll a web page or browser screen causes different sets to appear on the display device of the user computer successively; FIG. 5A shows a first set, and other drawing views show other sets that can appear together on the same scrollable page.

In an embodiment, the visual dashboard 500 comprises a cluster distribution panel 502 programmed to render a pie chart 504 showing a number of profiles or customers in each segment that the segmentation instructions 116 have generated. In the example, pie chart 504 shows three segments having customer counts of 262, 694, and 1.02K, respectively. The visual dashboard 500 also can comprise a within-cluster panel 506 and silhouette score panel 508 that are programmed to show metrics for mathematically selecting the best number of segments for the data. In an embodiment, the within-cluster panel 506 is programmed to show a line graph for the metric within-cluster sum of squares, which measures how compact each cluster's points are. The WSS will decrease with more clusters, so the line monotonically decreases. An elbow of the graph indicates the greatest marginal decrease in WSS. If override_k is set to no, the number of segments created by the model will reflect the best k (number of clusters) as determined by this line.

In an embodiment, the silhouette score panel 508 is programmed to display a line graph that measures the relative difference between points within a cluster to points outside a cluster and, thus, a degree of separation of clusters. Generally, a higher score is better. The optimal number of clusters shown by both metrics might not be the same, so users can test results from different numbers of clusters.

The model history table 410 (FIG. 4B) can be displayed near the cluster distribution panel 502, within-cluster panel 506, and silhouette score panel 508.

Figure 5B:
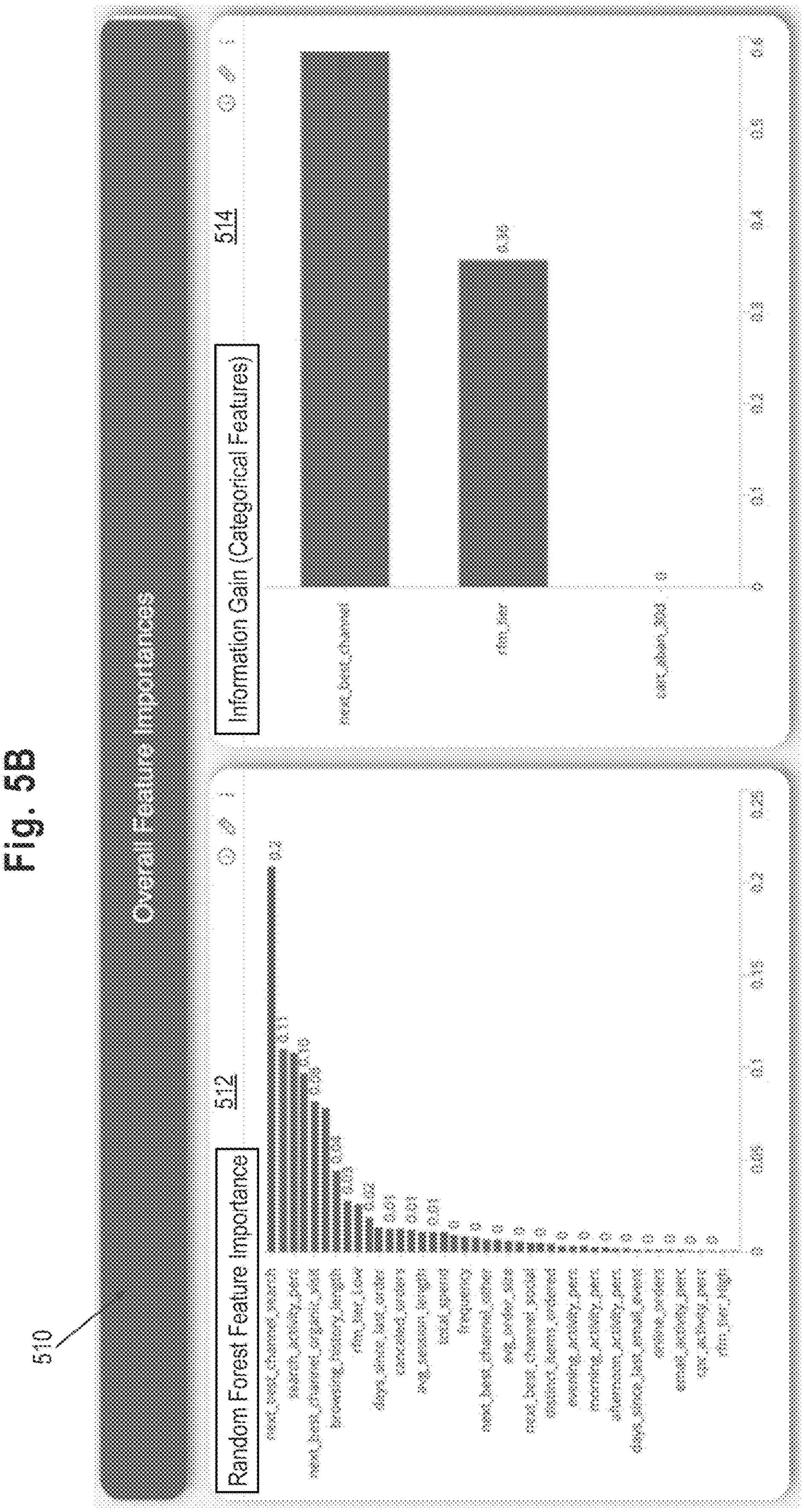
FIG. 5B illustrates a second example of a portion of a visual dashboard that the segmentation interface can generate.

OVERALL MODEL-LEVEL FEATURE IMPORTANCES. FIG. 5B illustrates a second example of a portion 510 of a visual dashboard that the segmentation interface can generate. In an embodiment, a Random Forest Feature Importance panel 512 is programmed to display a bar chart showing which input attributes among all available attributes can distinguish clusters or segments most. In an embodiment, an Information Gain panel 514 is programmed to display a bar chart that ranks categorical or string attributes in a similar way. Higher information gain means the feature was more significant in determining the segmentation result. If prioritized features are used, those features should contribute to higher information gain.

Figure 5C:
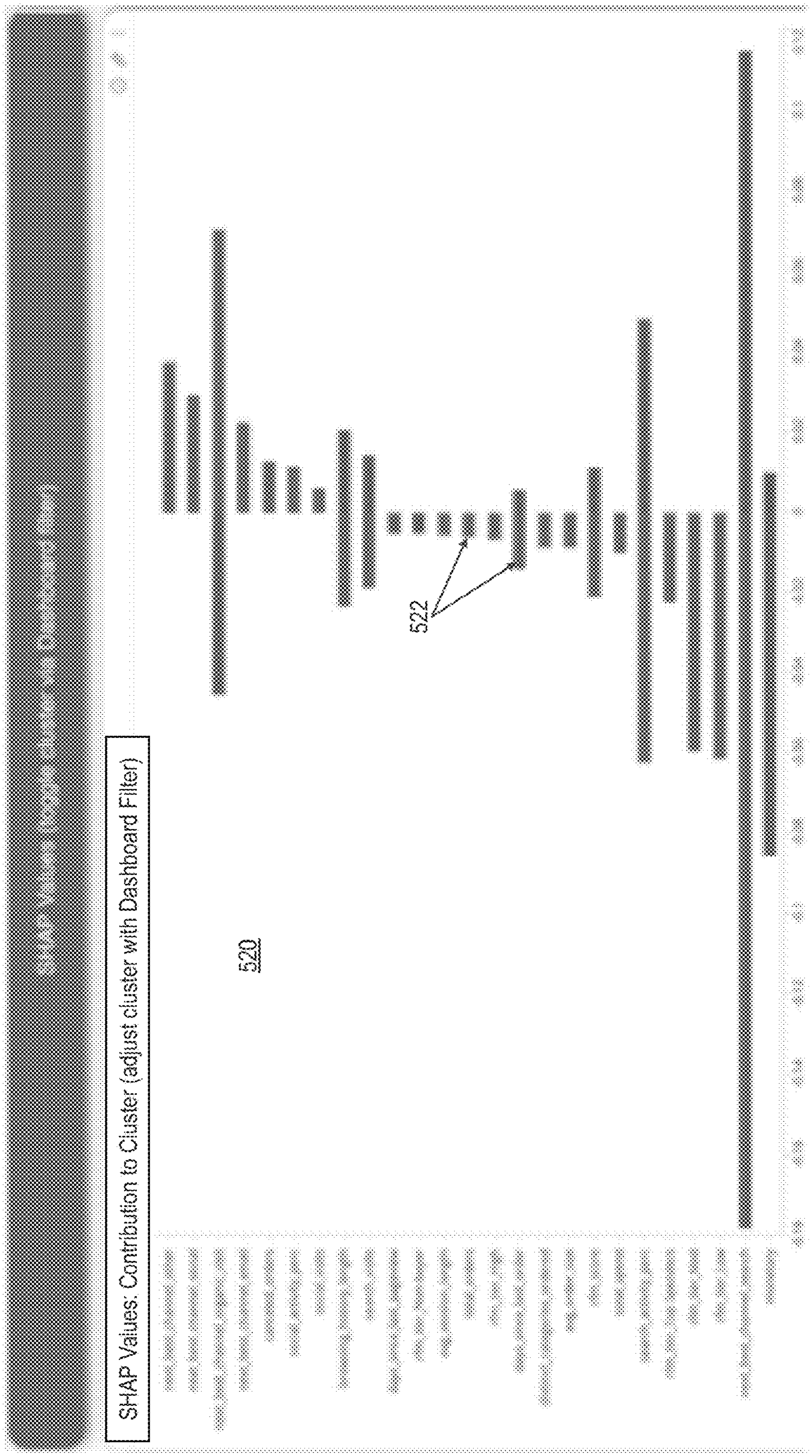
FIG. 5C illustrates a third example of a portion of a visual dashboard that the segmentation interface can generate.

SHAP VALUES. FIG. 5C illustrates a third example of a portion of a visual dashboard that the segmentation interface can generate. In an embodiment, a SHAP Values chart 520 is programmed to display attribute values and corresponding negative or positive SHAP values. In an embodiment, the SHAP Values chart 520 is programmed to accept input to toggle the view by segment. The SHAP Values chart 520 comprises a plurality of bars 522, and each bar's length refers to the average SHAP value of the feature. A high SHAP value shown by long bars extending to the right means that the attribute strongly characterizes the cluster. The color of the bar indicates whether high (green) or low (red) values are more significant to that cluster; other embodiments can use different colors. The cluster represented in FIG. 5C is highly characterized by an RFM Tier of Medium, high monetary values, and high conversions.

Figure 5D:
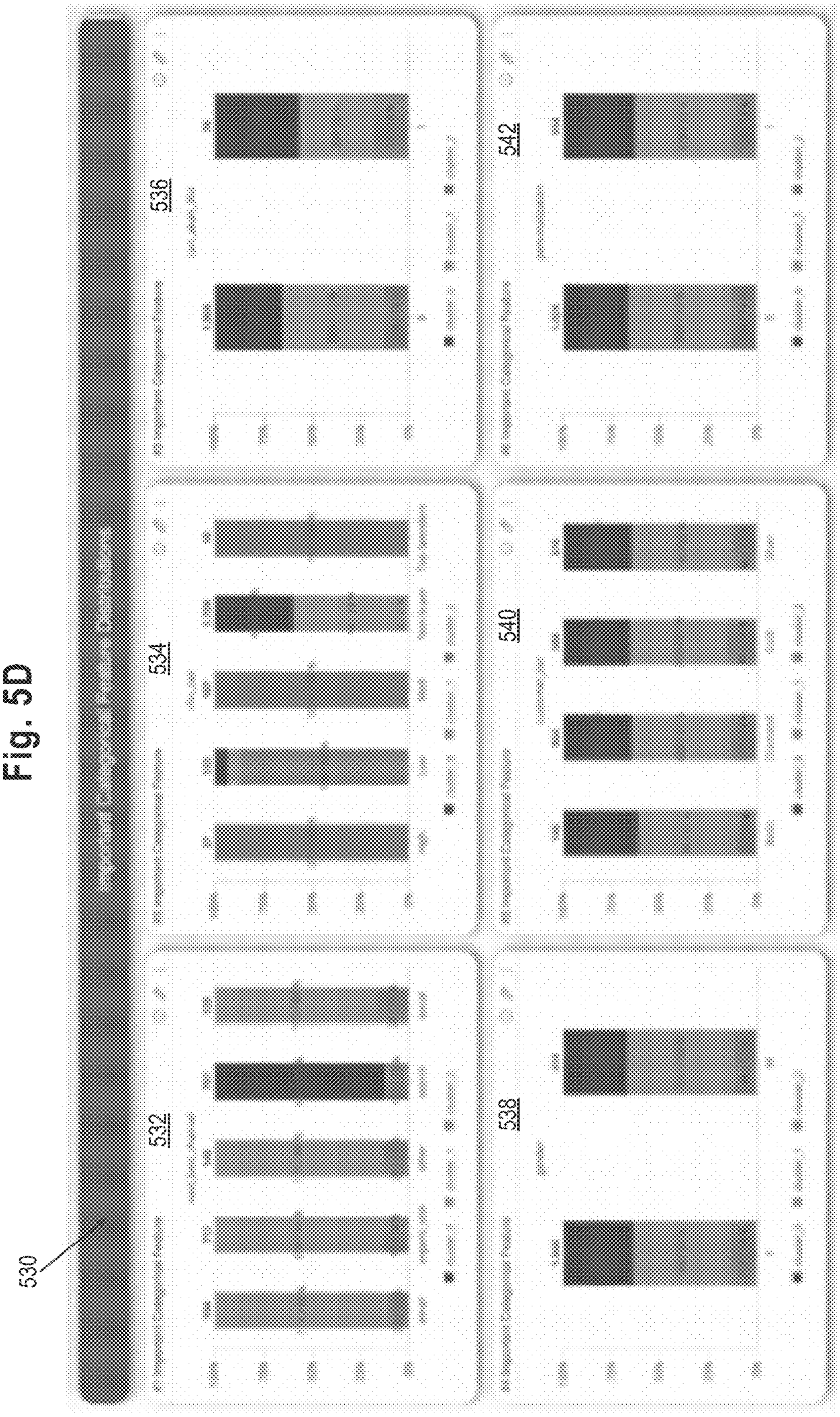
FIG. 5D illustrates a fourth example of a portion of a visual dashboard that the segmentation interface can generate.

IMPORTANT CATEGORICAL FEATURES. FIG. 5D illustrates a fourth example of a portion of a visual dashboard that the segmentation interface can generate. In an embodiment, an Important Categorical Feature Distributions panel 530 is programmed to display a plurality of graph sub-panels 532, 534, 536, 538, 540, 542, where each of the sub-panels corresponds to a different important categorical feature of the segment. In an embodiment, the sub-panels are ranked in the Important Categorical Feature Distributions panel 530 by information gain. Thus, sub-panels of the Important Categorical Feature Distributions panel 530 show the distribution of important categorical features across clusters. These graphs can characterize each group by an attribute.

Figure 5E:
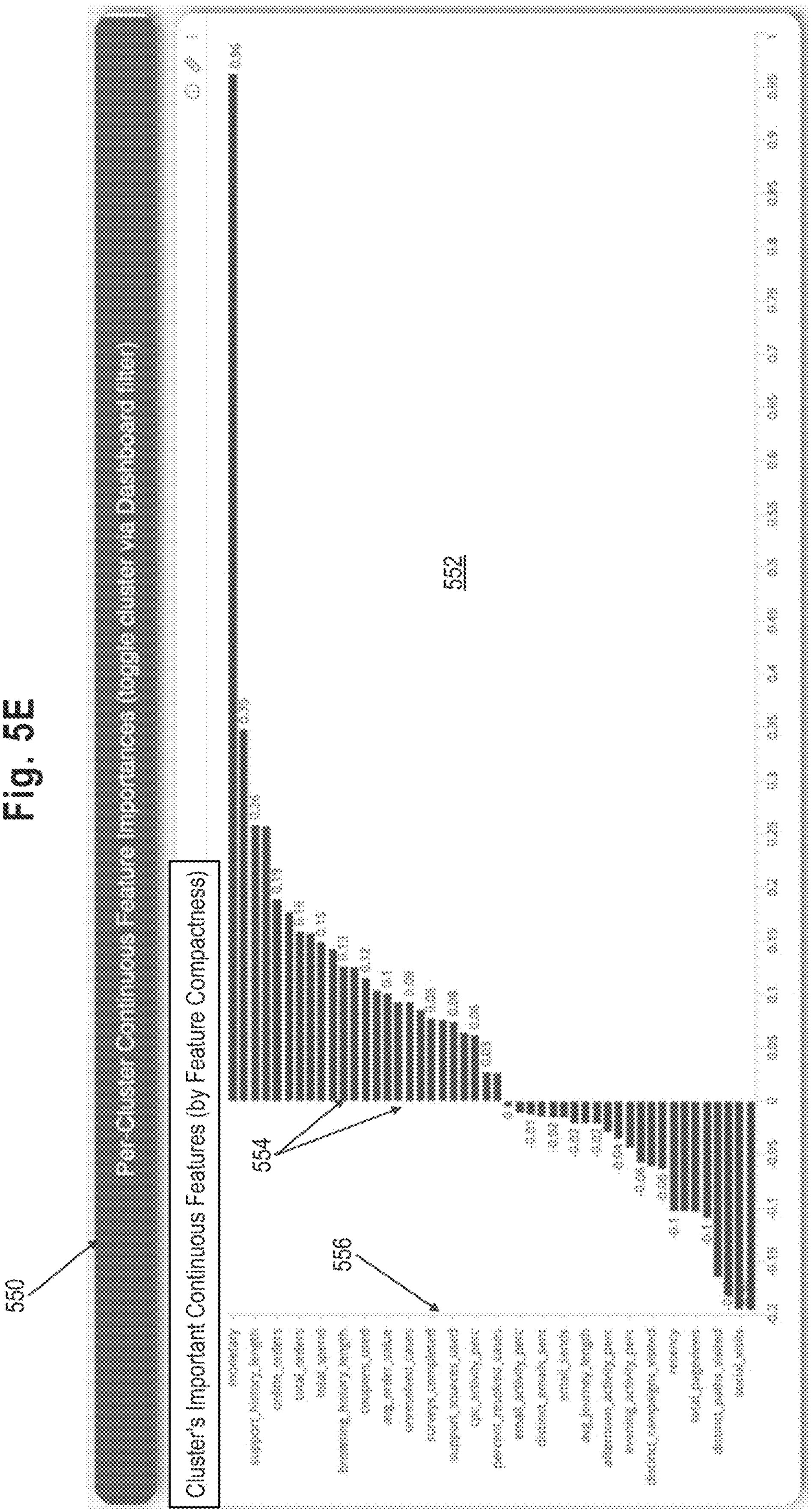
FIG. 5E illustrates a fifth example of a portion of a visual dashboard that the segmentation interface can generate.

CONTINUOUS IMPORTANT FEATURES. FIG. 5E illustrates a fifth example of a portion of a visual dashboard that the segmentation interface can generate. In an embodiment, a Per-Cluster Continuous Feature Importances panel 550 is programmed to display a bar graph 552 comprising a plurality of graphical bars 554 that visually represent the magnitude of values of corresponding attributes 556 of a segment. A metric of relative feature compactness is used to determine important continuous attributes. The metric measures the feature's relative standard deviation across each cluster and the entire input dataset based on the inventive recognition that if the standard deviation of a feature is much smaller in a single cluster compared to the population, that feature is more likely able to be used to characterize that cluster.

For example, if CLTV (Customer Lifetime Value) is distributed nearly evenly from 0-100, that value has a relatively large standard deviation. If Cluster 1 has a CLTV range of 80-100, it has a relatively lower standard deviation compared to the population, so CLTV might be a good descriptor of the cluster, i.e. Cluster 1 has customers with high lifetime value. The metric is measured between [−1, 1]. Higher values indicate more significant features in the cluster or segment. A Dashboard filter allows seeing important continuous attributes per cluster.

Figure 5F:
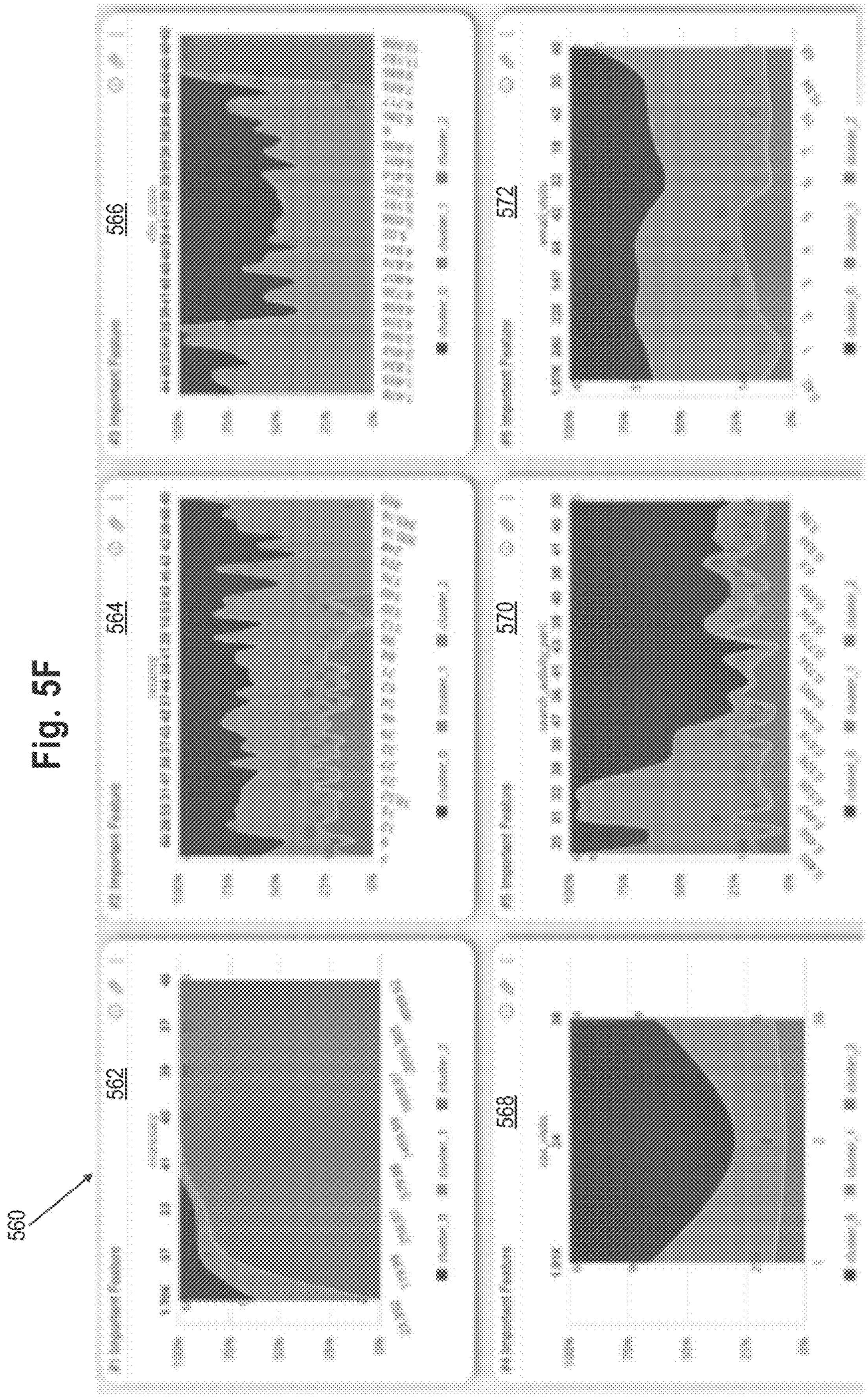
FIG. 5F illustrates a sixth example of a portion of a visual dashboard that the segmentation interface can generate.

FIG. 5F illustrates a sixth example of a portion of a visual dashboard that the segmentation interface can generate. FIG. 5F illustrates a variation of the visual displays of FIG. 5D and comprises a graphical panel 560 having a plurality of proportional histograms 562, 564, 566, 568, 570, 572, each showing the distribution of different important attributes across clusters. The histograms of FIG. 5F can be ranked within panel 560 by feature compactness. Like the bar graphs for categorical features, the histograms of FIG. 5F indicate the ranges of values of an attribute per each cluster, helping a user determine cluster labels.

Figure 5G:
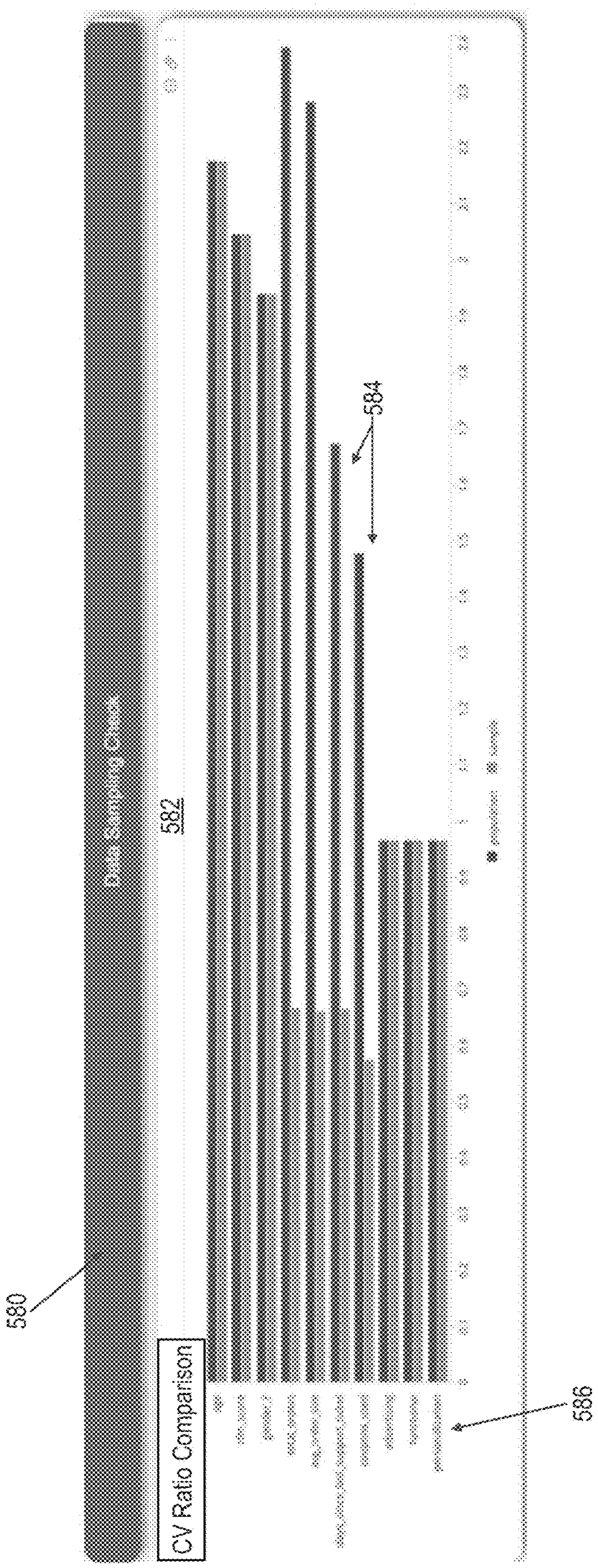
FIG. 5G illustrates a seventh example of a portion of a visual dashboard that the segmentation interface can generate.

CV RATIO CHECK. FIG. 5G illustrates a seventh example of a portion of a visual dashboard that the segmentation interface can generate. In an embodiment, a Data Sampling Check panel 580 of the visual dashboard comprises a CV Ratio Comparison bar graph 582 having a plurality of bars 584 that visually represent the magnitude of corresponding features 586. Note that two bars 584 appear in pairs for each feature 586. To ensure a representative population, the CV Ratio of the population and the modeling sample for several features is shown. The bars 584 within each feature 586 should be similar, but a difference under "5" is safe. If the CV Ratios differ significantly, the model should be rerun using a different random sample.

2.4 Creating Audiences and Use Cases with Model Outputs

Figure 6A:
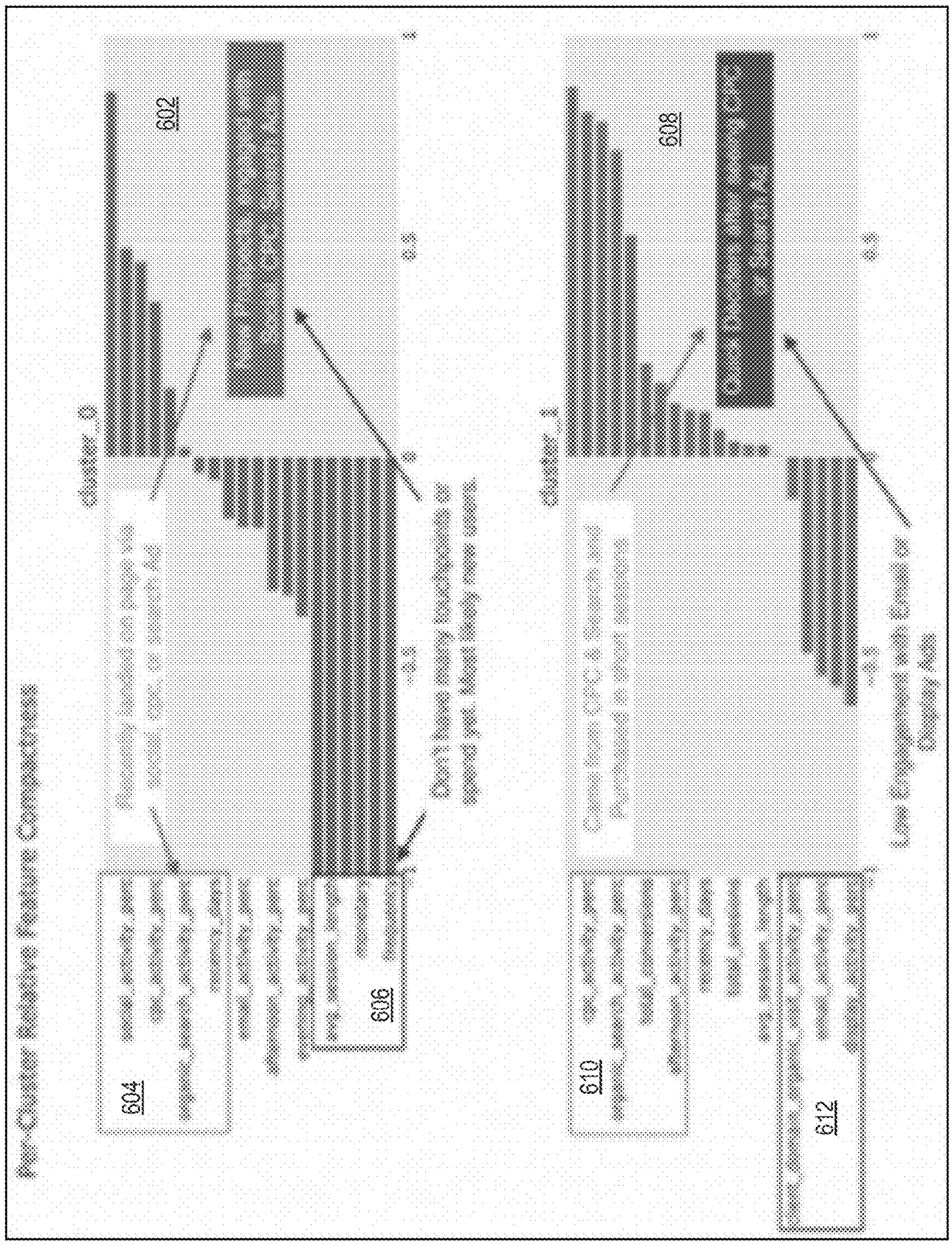
FIG. 6A and FIG. 6B illustrate examples of labeled feature compactness graphs used to define labels in one example of use.
Figure 6B:
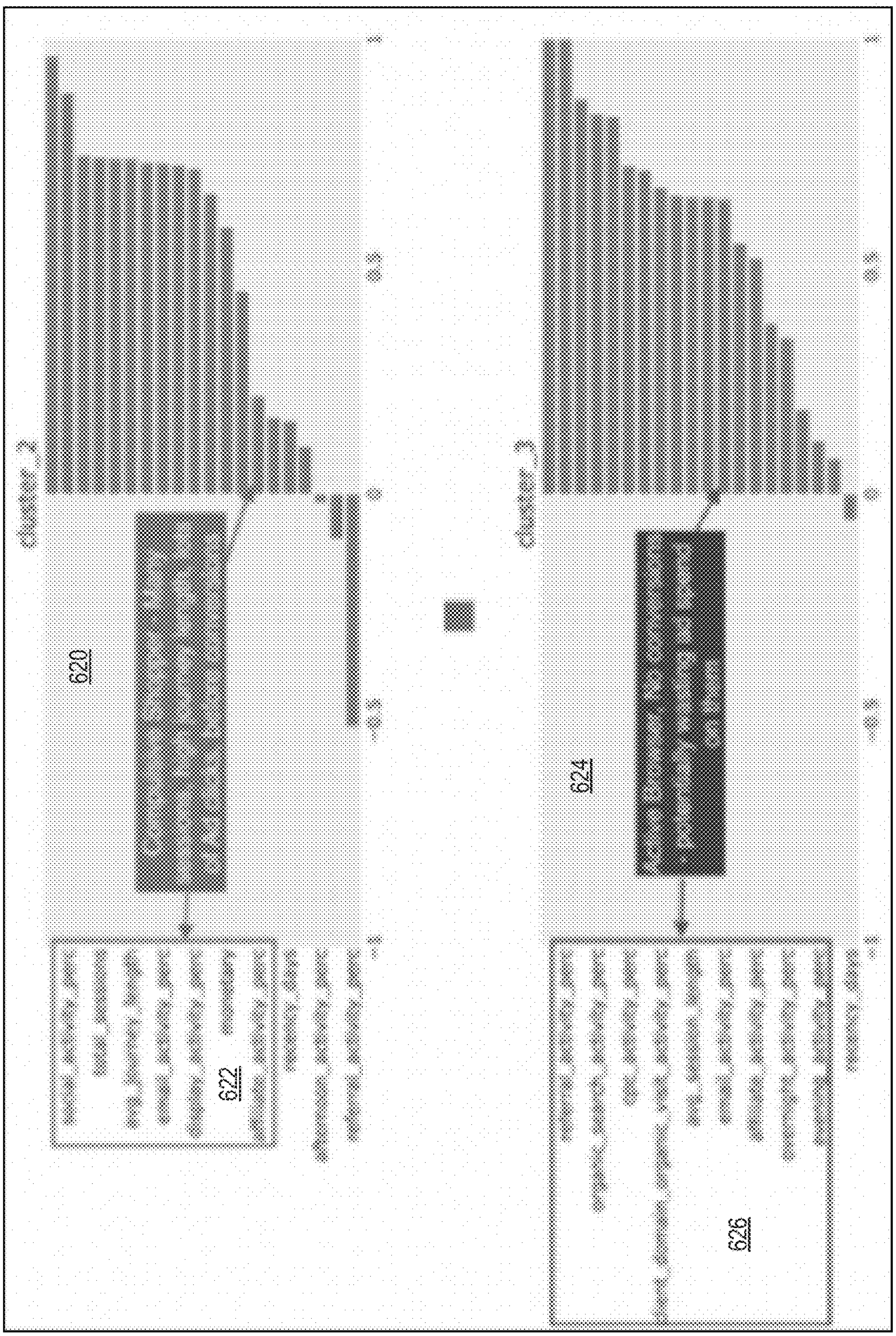

In an embodiment, once the user computer 102 provides input for business labels for each cluster the model identified, the labels are added to the parent segments, and the base audiences automatically become available in an audience editor. FIG. 6A, FIG. 6B illustrate examples of labeled feature compactness graphs used to define labels in one example of use. Referring first to FIG. 6A, in an embodiment, inspection of feature values of a first cluster 602 shows a first set of features 604 indicating that customers in the segment recently landed on a merchant webpage via social, CPC, or a search ad. Further, features 606 indicate that the CDP does not store data indicating that the customers have many touchpoints or purchases with the merchant. Therefore, the label "New Prospects, engaged with Social, CPC, Search Ads" could be given to the cluster to represent behaviors or attributes of the customers in the cluster.

Also, in FIG. 6A, the data for a second cluster 608 comprises a first set of features 610 with bar graph values indicating that the customers of the cluster came from CPC and search engines and purchased in short sessions. The same cluster also has a second set of features 612, indicating low engagement with email or display ads. Therefore, the label "Quick Deciders after seeing CPC or Search Ad" could be used for the cluster.

Referring now to FIG. 6B, the data for a third cluster 620 comprises a first set of features 622 with bar graph values indicating that the customers of the cluster conducted many sessions, had a high journey length, and many ad clicks before conversions. Therefore, the label "Compulsive Shopper" could be given to the cluster. A fourth cluster 624 also has a first set of features 626, indicating extensive browsing activity but no conversion, suggesting that any spending on advertising to those sessions would be wasted. Therefore, the label "Active Browser" could be used for the cluster.

Figure 7:
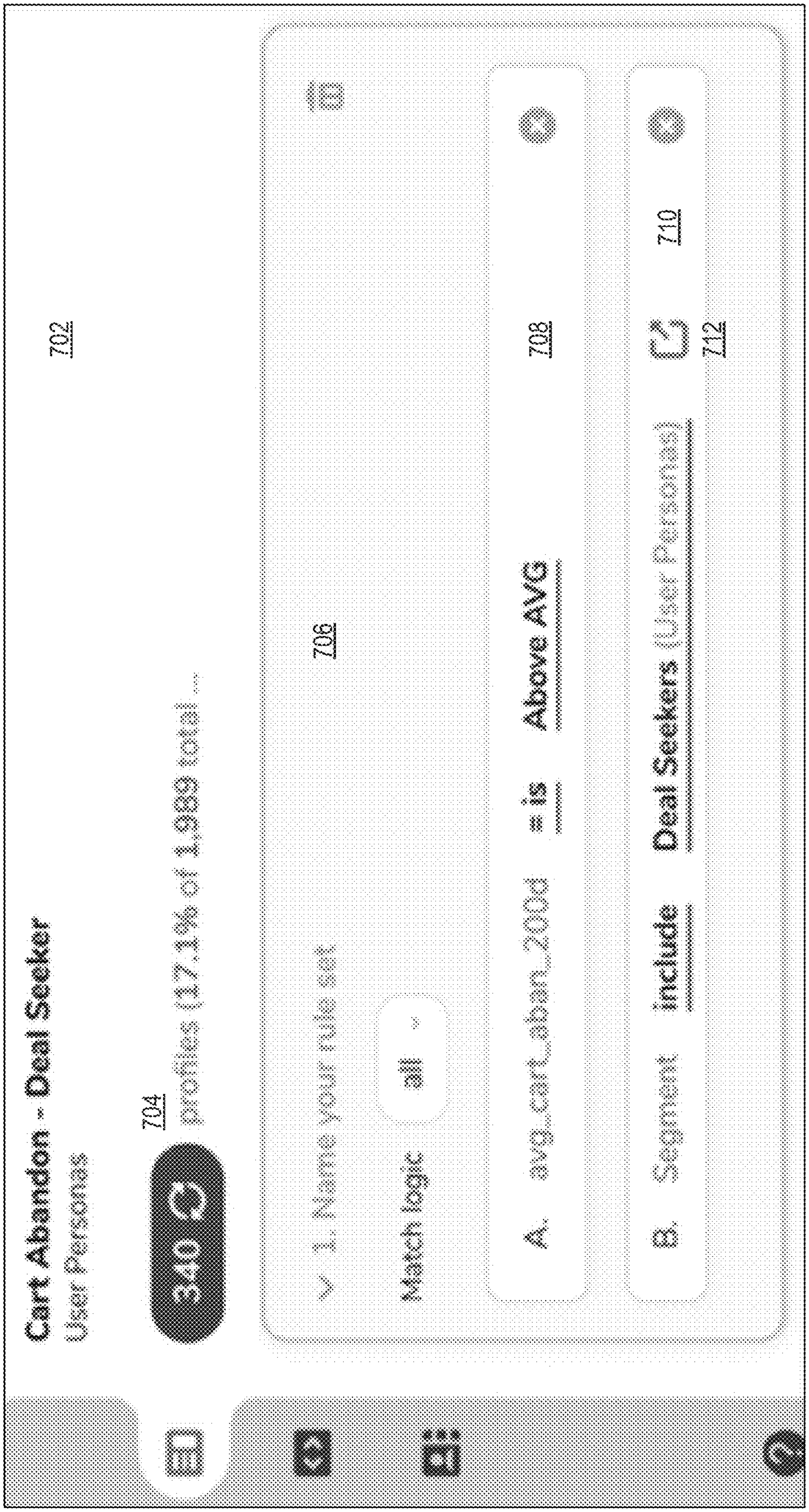
FIG. 7 illustrates an example of a graphical user interface that the audience segmentation interface can be programmed to display.

Users can use these audiences to build segments and activate external systems to direct electronic communications as part of marketing campaigns or other use cases. As an example, a user computer 102 could provide input specifying the following rules. 1. If a cluster is labeled Deal Seeker, representing users who only purchase after receiving a promotional code: 2 For users in the cluster who abandoned their shopping cart recently: 3. Send those users an email specifying a "Secret Sale" offer. FIG. 7 illustrates an example of a graphical user interface that the audience segmentation interface can be programmed to display. FIG. 7 represents an example of the interaction of user computer 102 with a visual programming interface for constructing audiences. In one embodiment, the technology disclosed in US Pat. Pub. No. US 2024-0126516 A1 can be used.

For example, after executing all the processes previously described and determining that the preceding business rules define an appropriate audience, a user computer 102 can access a virtual canvas and interoperate with visual journey orchestration instructions, all as described in the '516 patent publication referenced above, to create an audience definition as shown in a GUI window 702. In an embodiment, GUI window 702 comprises a profile summary area 704 specifying, for this example, that the audience defined by a rule set 706 having rules 708, 710 will match 340 profiles or 17.1% of 1,989 total available profiles. The rule set 706 comprises a first rule 708 joined to a second rule 710 by the matching logic ALL as specified in a pull-down GUI widget. The first rule 708 will be TRUE when the value of "avg_cart_aban_200d" is above a specified average amount. Typically the value "avg_cart_aban_200d" will correspond to one of the features shown in FIG. 6A or FIG. 6B. The second rule 710 will be TRUE when a segment of the profile data includes profiles previously denoted or labeled "Deal Seekers." The GUI window 702 includes an editing icon 712 near the label "Deal Seekers" and is programmed, when selected, to open an editing dialog with which the user computer 102 can provide input to review or change the criteria that define the "Deal Seekers" segment.

3. Implementation Example—Hardware Overview

According to one embodiment, the techniques described herein are implemented by at least one computing device. The techniques may be implemented in whole or in part using a combination of at least one server computer and/or other computing devices coupled using a network, such as a packet data network. The computing devices may be hard-wired to perform the techniques or may include digital electronic devices such as at least one application-specific integrated circuit (ASIC) or field programmable gate array (FPGA) that is persistently programmed to perform the techniques or may include at least one general purpose hardware processor programmed to perform the techniques pursuant to program instructions in firmware, memory, other storage, or a combination. To accomplish the described techniques, such computing devices may combine custom hard-wired logic, ASICs, or FPGAs with custom programming. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 8:
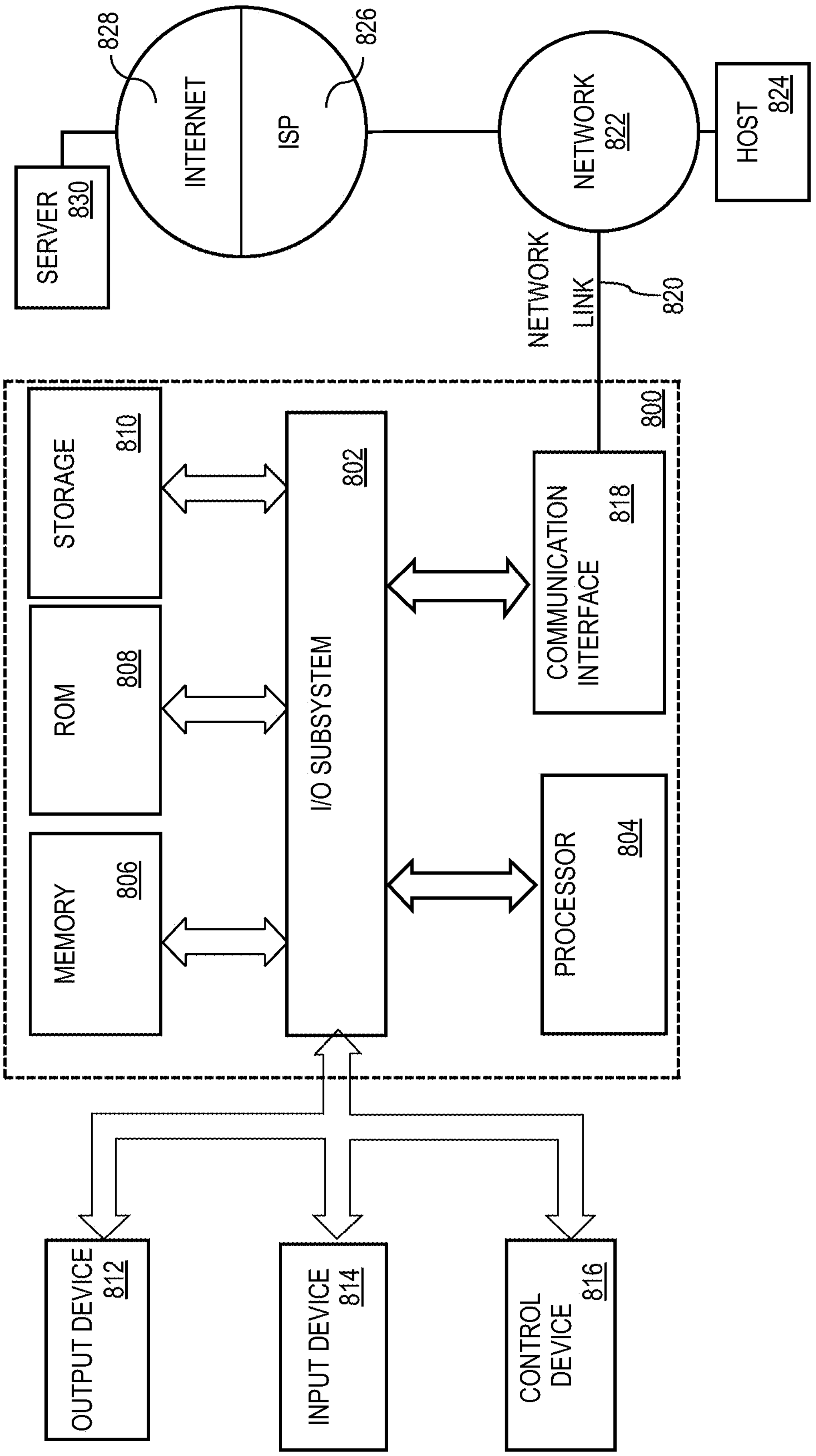
FIG. 8 illustrates a computer system with which one embodiment could be implemented.

FIG. 8 is a block diagram that illustrates an example computer system with which an embodiment may be implemented. In the example of FIG. 8, a computer system 800 and instructions for implementing the disclosed technologies in hardware, software, or a combination of hardware and software, are represented schematically, for example, as boxes and circles, at the same level of detail that is commonly used by persons of ordinary skill in the art to which this disclosure pertains for communicating about computer architecture and computer systems implementations.

Computer system 800 includes an input/output (I/O) subsystem 802, which may include a bus and/or other communication mechanism(s) for communicating information and/or instructions between the components of the computer system 800 over electronic signal paths. The I/O subsystem 802 may include an I/O controller, a memory controller, and at least one I/O port. The electronic signal paths are represented schematically in the drawings, such as lines, unidirectional arrows, or bidirectional arrows.

At least one hardware processor 804 is coupled to I/O subsystem 802 for processing information and instructions. Hardware processor 804 may include, for example, a general-purpose microprocessor or microcontroller and/or a special-purpose microprocessor such as an embedded system, a graphics processing unit (GPU), a digital signal processor, or an ARM processor. Processor 804 may comprise an integrated arithmetic logic unit (ALU) or be coupled to a separate ALU.

Computer system 800 includes one or more units of memory 806, such as a main memory, coupled to I/O subsystem 802 for electronically digitally storing data and instructions to be executed by processor 804. Memory 806 may include volatile memory such as various forms of random-access memory (RAM) or other dynamic storage device. Memory 806 may also be used for storing temporary variables or other intermediate information during the execution of instructions to be executed by processor 804. Such instructions, when stored in non-transitory computer-readable storage media accessible to processor 804, can render computer system 800 into a special-purpose machine customized to perform the operations specified in the instructions.

Computer system 800 includes non-volatile memory such as read-only memory (ROM) 808 or other static storage devices coupled to I/O subsystem 802 for storing information and instructions for processor 804. The ROM 808 may include various forms of programmable ROM (PROM), such as erasable PROM (EPROM) or electrically erasable PROM (EEPROM). A unit of persistent storage 810 may include various forms of non-volatile RAM (NVRAM), such as FLASH memory, solid-state storage, magnetic disk, or optical disks such as CD-ROM or DVD-ROM and may be coupled to I/O subsystem 802 for storing information and instructions. Storage 810 is an example of a non-transitory computer-readable medium that may be used to store instructions and data which, when executed by the processor 804, cause performing computer-implemented methods to execute the techniques herein.

The instructions in memory 806, ROM 808, or storage 810 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation, application, and data storage layer, such as a relational database system using a structured query language (SQL) or no SQL, an object store, a graph database, a flat file system, or other data storage.

Computer system 800 may be coupled via I/O subsystem 802 to at least one output device 812. In one embodiment, output device 812 is a digital computer display. Examples of a display that may be used in various embodiments include a touchscreen display, a light-emitting diode (LED) display, a liquid crystal display (LCD), or an e-paper display. Computer system 800 may include other types of output devices 812, alternatively or in addition to a display device. Examples of other output devices 812 include printers, ticket printers, plotters, projectors, sound cards or video cards, speakers, buzzers or piezoelectric devices or other audible devices, lamps or LED or LCD indicators, haptic devices, actuators or servos.

At least one input device 814 is coupled to I/O subsystem 802 for communicating signals, data, command selections, or gestures to processor 804. Examples of input devices 814 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 816, which may perform cursor control or other automated control functions such as navigation in a graphical interface on a display screen, alternatively or in addition to input functions. The control device 816 may be a touchpad, a mouse, a trackball, or cursor direction keys for communicating direction information and command selections to processor 804 and for controlling cursor movement on an output device 812, such as a display. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism, or other control device. An input device 814 may include a combination of multiple input devices, such as a video camera and a depth sensor.

In another embodiment, computer system 800 may comprise an Internet of Things (IoT) device in which one or more of the output device 812, input device 814, and control device 816 are omitted. Or, in such an embodiment, the input device 814 may comprise one or more cameras, motion detectors, thermometers, microphones, seismic detectors, other sensors or detectors, measurement devices or encoders, and the output device 812 may comprise a special-purpose display such as a single-line LED or LCD display, one or more indicators, a display panel, a meter, a valve, a solenoid, an actuator or a servo.

When computer system 800 is a mobile computing device, input device 814 may comprise a global positioning system (GPS) receiver coupled to a GPS module that is capable of triangulating to a plurality of GPS satellites, determining and generating geo-location or position data such as latitude-longitude values for a geophysical location of the computer system 800. Output device 812 may include hardware, software, firmware, and interfaces for generating position reporting packets, notifications, pulse or heartbeat signals, or other recurring data transmissions that specify a position of the computer system 800, alone or in combination with other application-specific data, directed toward host computer 824 or server computer 830.

Computer system 800 may implement the techniques described herein using customized hard-wired logic, at least one ASIC or FPGA, firmware, and/or program instructions or logic which, when loaded and used or executed in combination with the computer system, causes or programs the computer system to operate as a special-purpose machine. According to one embodiment, the techniques herein are performed by computer system 800 in response to processor 804 executing at least one sequence of at least one instruction contained in main memory 806. Such instructions may be read into main memory 806 from another storage medium, such as storage 810. Execution of the sequences of instructions contained in main memory 806 causes processor 804 to perform the process steps described herein. In alternative embodiments, hard-wired circuitry may be used in place of or in combination with software instructions.

The term "storage media," as used herein, refers to any non-transitory media that store data and/or instructions that cause a machine to operate in a specific fashion. Such storage media may comprise non-volatile media and/or volatile media. Non-volatile media includes, for example, optical or magnetic disks, such as storage 810. Volatile media includes dynamic memory, such as memory 806. Common forms of storage media include, for example, a hard disk, solid state drive, flash drive, magnetic data storage medium, any optical or physical data storage medium, memory chip, or the like.

Storage media is distinct but may be used with transmission media. Transmission media participates in transferring information between storage media. For example, transmission media includes coaxial cables, copper wire and fiber optics, and wires comprising a bus of I/O subsystem 802. Transmission media can also be acoustic or light waves generated during radio-wave and infrared data communications.

Various forms of media may carry at least one sequence of at least one instruction to processor 804 for execution. For example, the instructions may initially be carried on a remote computer's magnetic disk or solid-state drive. The remote computer can load the instructions into its dynamic memory and send them over a communication link such as a fiber optic, coaxial cable, or telephone line using a modem. A modem or router local to computer system 800 can receive the data on the communication link and convert the data to a format that can be read by computer system 800. For instance, a receiver such as a radio frequency antenna or an infrared detector can receive the data carried in a wireless or optical signal, and appropriate circuitry can provide the data to I/O subsystem 802, such as placing the data on a bus. I/O subsystem 802 carries the data to memory 806, from which processor 804 retrieves and executes the instructions. The instructions received by memory 806 may optionally be stored on storage 810 either before or after execution by processor 804.

Computer system 800 also includes a communication interface 818 coupled to a bus or I/O subsystem 502. Communication interface 818 provides a two-way data communication coupling to a network link(s) 820 directly or indirectly connected to at least one communication network, such as a network 822 or a public or private cloud on the Internet. For example, communication interface 818 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 822 broadly represents a local area network (LAN), wide-area network (WAN), campus network, internetwork, or any combination thereof. Communication interface 818 may comprise a LAN card to provide a data communication connection to a compatible LAN, a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 818 sends and receives electrical, electromagnetic, or optical signals over signal paths that carry digital data streams representing various types of information.

Network link 820 typically provides electrical, electromagnetic, or optical data communication directly or through at least one network to other data devices, using, for example, satellite, cellular, Wi-Fi, or BLUETOOTH technology. For example, network link 820 may connect through network 822 to a host computer 824.

Furthermore, network link 820 may connect through network 822 or to other computing devices via internetworking devices and/or computers operated by an Internet Service Provider (ISP) 826. ISP 826 provides data communication services through a worldwide packet data communication network called Internet 828. A server computer 830 may be coupled to Internet 828. Server computer 830 broadly represents any computer, data center, virtual machine, or virtual computing instance with or without a hypervisor or computer executing a containerized program system such as DOCKER or KUBERNETES. Server computer 830 may represent an electronic digital service that is implemented using more than one computer or instance, and that is accessed and used by transmitting web services requests, uniform resource locator (URL) strings with parameters in HTTP payloads, API calls, app services calls, or other service calls. Computer system 800 and server computer 830 may form elements of a distributed computing system that includes other computers, a processing cluster, a server farm, or other organizations of computers that cooperate to perform tasks or execute applications or services. Server computer 830 may comprise one or more instructions organized as modules, methods, objects, functions, routines, or calls. The instructions may be organized as one or more computer programs, operating system services, or application programs, including mobile apps. The instructions may comprise an operating system and/or system software; one or more libraries to support multimedia, programming, or other functions; data protocol instructions or stacks to implement TCP/IP, HTTP, or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server computer 830 may comprise a web application server that hosts a presentation layer, application layer, and data storage layer, such as a relational database system using a structured query language (SQL) or no SQL, an object store, a graph database, a flat file system or other data storage.

Computer system 800 can send messages and receive data and instructions, including program code, through the network(s), network link 820, and communication interface 818. In the Internet example, server computer 830 might transmit a requested code for an application program through Internet 828, ISP 826, local network 822, and communication interface 818. The received code may be executed by processor 804 as it is received and/or stored in storage 810 or other non-volatile storage for later execution.

The execution of instructions, as described in this section, may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may execute those instructions. Several processes may be associated with the same program; for example, opening up several instances of the same program often means more than one process is being executed. Multitasking may be implemented to allow multiple processes to share processor 804. While each processor 804 or core of the processor executes a single task at a time, computer system 800 may be programmed to implement multitasking to allow each processor to switch between tasks that are being executed without having to wait for each task to finish. In an embodiment, switches may be performed when tasks perform input/output operations when a task indicates that it can be switched or on hardware interrupts. Time-sharing may be implemented to allow fast response for interactive user applications by rapidly performing context switches to provide the appearance of concurrent execution of multiple processes. In an embodiment, for security and reliability, an operating system may prevent direct communication between independent processes, providing strictly mediated and controlled inter-process communication functionality.

4. Benefits and Improvements

The disclosed solutions significantly expand the capability of segment editors and segmentation analysis. An embodiment provides a highly scalable, compute-efficient Presto-Hive framework compared to Python-only K-means for clustering. An embodiment can save the model params as database tables and do near-real-time scoring of new users using only Presto/Hive custom functions. An embodiment is easy to customize by non-technical users via simple params (no code required) to get cluster outputs that are meaningful and actionable for their business use cases. An embodiment is easily accessible in CDP tables and a visual dashboard, precluding the need for a Python environment and running heavy Pandas functions to visualize outputs. An embodiment provides a simplified visual dashboard for easy cluster analysis and determining the business definition of each audience by non-technical marketers/business analysts. An embodiment enables users to add custom business definition labels to each cluster and automatically add those audience names to an audience editor to enable marketers/non-technical users to do campaign orchestration and activation for each audience in a simple point-and-click user interface.

In the foregoing specification, embodiments of the invention have been described with reference to numerous specific details that may vary from implementation to implementation. Accordingly, the specification and drawings should be regarded in an illustrative rather than a restrictive sense. The sole and exclusive indicator of the scope of the invention, and what is intended by the applicants to be the scope of the invention, is the literal and equivalent scope of the set of claims issued from this application in the specific form in which such claims issue, including any subsequent correction.

5. Appendix of Example Scripts and Code

```
PYTHON - create_datamodel.py
import os
import sys
##-- Declare ENV Variables from YML file
apikey = os.environ['TD_API_KEY']
tdserver = os.environ['TD_API_SERVER']
sink_database = os.environ['SINK_DB']
output_table = os.environ['OUTPUT_TABLE']
#pip-install datamodel create library
os.system(f"{sys.executable} -m pip install td-ml-datamodel-create")
#import all functions and variables from library
from td_ml_datamodel_create import *
CONFIG.JSON
{
"model_name": "as_prod"
,
'model_tables": [
   {"db":"sink_database","name":"as_feature_importances"},
   {"db":"sink_database","name":"as_dash_histograms"},
   {"db":"sink_database","name":"as_dash_compactness"},
   {"db":"sink_database","name":"as_model_params"},
   {"db":"sink_database","name":"as_eda"}
     ]
,
"shared_user_list": ["ps-ml-analytics+psdemo@treasure-data.com",
"dilyan.kovachev+psdemo@treasure-data.com", "yish.lim+psdemo@treasure-data.com",
"saisuraj.argula+psdemo@treasure-data.com", "gurbaksh.sharma+psdemo@treasure-data.com",
"se-us+psdemo@treasure-data.com", "prof-services+psdemo@treasure-data.com"]
,
"change_schema_cols": {"date": ["runtime"], "text": ["ENTER_NAME"], "float":
["ENTER_NAME"], "bigint": ["ENTER_NAME"]}
,
"join_relations": {"pairs":
[
   {"db1": "sink_database", "tb1":"as_feature_importances","join_key1":"session_id","db2":
"sink_database","tb2":"as_dash_compactness","join_key2":"session_id"},
   {"db1": "sink_database", "tb1":"as_feature_importances","join_key1":"session_id","db2":
"sink_database","tb2":"as_model_params","join_key2":"session_id"},
   {"db1": "sink_database", "tb1":"as_feature_importances","join_key1":"session_id","db2":
"sink_database","tb2":"as_dash_histograms","join_key2":"session_id"},
   {"db1": "sink_database", "tb1":"as_feature_importances","join_key1":"session_id","db2":
"sink_database","tb2":"as_eda","join_key2":"session_id"}
]
        }
}
```

DATAMODEL_BUILD.DIG

```
_export:
   !include : 'config/input_params.yml'
   !include : 'config.json'
   td:
      database: ${sink_database}
+extract_model_oid_from_hist_table:
   td>:
   data: "SELECT oid FROM ${sink_database}.${model_config_table} WHERE name =
'${model_name}' "
   store_last_results: true
###-- Workflow to refresh the datamodel with updated tables and data schema
+call_post_builds:
   http>: "https://${api_endpoint}/reporting/datamodels/${td.last_results.oid}/builds"
   method: POST
```

-continued

```
  headers:
    - authorization: "TD1 ${secret:ti__key}"
    - cache-control: "no-cache"
    - accept: "application/json"
    - content-type: "application/json"
  content:
    buildType: "full"
  content__format: "json"
  store__content: true
+echo:
  echo>: ${http.last__content}
```

DATAMODEL_CREATE.DIG

```
__export:
  !include : 'config/input__params.yml'
  !include : 'config.json'
  td:
    database: ${sink__database}
#Check if any datamodels were built and if history table exists
+check__if__model__history__table__exists:
  td>:
    data: "SELECT table__name FROM INFORMATION__SCHEMA.TABLES WHERE
REGEXP__LIKE(table__schema, '${sink__database}') AND table__name = '${model__config__table}'
"
  store__last__results: true
+if__table__exists__check__if__model__was__built:
  if>: ${td.last__results.table__name == model__config__table}
  __do:
    +echo1:
      echo>: 'History Table ${model__config__table} Exists. Check if datamodel ${model__name}
exists in history table, or if it needs to be built for the first time'
    ##### Check if Model has already been created
    +check__if__model__was__built:
      td>:
        data: "SELECT name FROM ${sink__database}.${model__config__table} WHERE name =
'${model__name}' "
      store__last__results: true
    +check__if__modename__exists__in__history:
      if>: ${td.last__results.name == model__name}
      __do:
        +echo1:
          echo>: 'Datamodel with the name ${model__name} already exists'
      __else__do:
        +echo2:
          echo>: 'Datamodel ${model__name} will be created next...'
        ##### Create Datamodel for the first time
        +create__datamodel__for__the__first__time:
            py>: python__files.create__datamodel.create__model
            __env:
              TD__API__KEY: '${secret:ti__key}'
              TD__API__SERVER: '${api__endpoint}'
              SINK__DB: '${sink__database}'
              OUTPUT__TABLE: '${model__config__table}'
            docker:
              image: "digdag/digdag-python:3.9"
  __else__do:
    +echo2:
      echo>: 'Datamodel ${model__name} will be created next...'
    ##### Create Datamodel for the first time
    +create__datamodel__for__the__first__time:
        py>: python__files.create__datamodel.create__model
        __env:
          TD__API__KEY: '${secret:ti__key}'
          TD__API__SERVER: '${api__endpoint}'
          SINK__DB: '${sink__database}'
          OUTPUT__TABLE: '${model__config__table}'
        docker:
          image: "digdag/digdag-python:3.9"
```

ML_AUTOSEG_PREDICT.DIG

```
_export:
  !include : 'config/input_params.yml'
  td:
    database: ${sink_database}
####### CREATE EMPTY TABLES ##############
+create_empty_schema_table:
  td_ddl>:
  empty_tables: ["schema"]
##### CREATE TABLE OF NEW USERS TO PREDICT ############
+create_new_users_to_predict_table:
  td>: sql/create_new_user_to_predict_table.sql
  create_table: as_predictions_base_temp
+coalesce_nulls:
  +get_syntax:
    db: ${sink_database}
    tbl: as_predictions_base_temp
    td>: sql/coalesce_nulls.sql
    store_last_results: true
  +create_final_base:
    td>:
    query: "SELECT ${td.last_results.query_syntax} FROM as_predictions_base_temp"
    create_table: as_predictions_base
+check_if_there_are_new_users_to_predict:
  td>:
  query: "SELECT APPROX_DISTINCT(${user_id}) as num_users FROM
as_predictions_base"
  store_last_results: true
+check_if_new_users_exist:
  if>: ${td.last_results.num_users == 0}
  _do:
    +echo_no_new_data:
      echo>: '---------- No New Users to Cluster ----------'
  _else_do:
    +echo_num_new_users_to_be_clustered:
      echo>: '-------- ${td.last_results.num_users} New Users will be Clustered next...'
    ######### GENERATE DUMMY SYNTAX ############
    +insert_dummy_syntax_non_boolean:
      td>: sql/select_dummies_non_boolean.sql
      insert_into: schema
    +insert_dummy_syntax_boolean:
      td>: sql/select_dummies_bool.sql
      insert_into: schema
    +generate_dummy_query:
      td>: sql/generate_dummy_query_syntax.sql
      store_last_results: true
    +create_dummy_features_table:
      td>: sql/create_features_dummy_table.sql
      create_table: as_predict_dummy_features
    +generate_query_for_numeric_features:
      td>: sql/select_numeric_features.sql
      store_last_results: true
    +create_final_features_table:
      td>: sql/join_trasnformed_features.sql
      create_table: as_predict_transformed_features
    ############ DO FEATURE MATRIX MULTIPLICATION TO SCALE FEATURES
##############
    +generate_query_vectorize:
      td>: sql/generate_vectorize_query_quant.sql
      store_last_results: true
    +vectorize_quant:
      td>: sql/vectorize_quant_presto.sql
      create_table: as_features_exploded
    ########### PREDICT USING RMSE ##############################
    +generate_query_rmse:
      td>: sql/generate_rmse_query.sql
      store_last_results: true
    +create_temp_predictions_table:
      td>: sql/output_preds_temp.sql
      create_table: as_predictions_temp
    +predict_cluster_labels:
      td>: sql/predict_cluster.sql
      create_table: as_predictions
```

-continued

```
############## CLEANUP TEMP TABLES ###########################
+check__if__cleanup__temp__tables__required:
  if>: ${cleanup__temp__tables == ‘yes’}
  __do:
    +clean__tables:
      td__ddl>:
      drop__tables: [“as__predictions__base__temp”, “as__predict__transformed__features”,
“as__predict__dummy__features”, “as__predictions__temp”, “as__features__exploded”, “schema”]
```

ML_AUTOSEG_PREMODEL.DIG

```
__export:
  !include : ‘config/input__params.yml’
  td:
    database: ${sink__database}
    engine: presto
### CREATE CUSTOM BASE TABLE
+query__columns:
  td>: sql/base__table__columns.sql
  store__last__results: true
+query__new__base:
  td>: sql/custom__base__table.sql
  create__table: as__base__table__temp
+coalesce__nulls:
  +get__syntax:
    db: ${sink__database}
    tbl: as__base__table__temp
    td>: sql/coalesce__nulls.sql
    store__last__results: true
  +create__final__base:
    td>:
    query: “SELECT ${td.last__results.query__syntax} FROM as__base__table__temp LIMIT
${model__sample__size}”
    create__table: as__base__table
+create__eda__table:
  td__for__each>: sql/select__eda__columns.sql
  __parallel: true
  __do
    +check__data__type:
      if>: ${td.each.data__type == ‘varchar’}
      __do:
        +cat__eda:
          td__for__each>: sql/select__eda__values.sql
          __parallel: true
          __do:
            td>: sql/eda__cat.sql
            insert__into: as__eda
      __else__do:
        +num__eda:
          td>: sql/eda__num.sql
          insert__into: as__eda
############## CLEANUP TEMP TABLES ###########################
+check__if__cleanup__temp__tables__required:
  if>: ${cleanup__temp__tables == ‘yes’}
  __do:
    +clean__tables:
      td__ddl>:
      drop__tables: [“as__base__table__temp”]
```

ML_AUTOSEG_PY.DIG

```
    __export:
      !include : ‘config/input__params.yml’
      td:
        database: ${sink__database}
        engine: presto
    #### Run Python K-Means Code
    +run__model__script:
      docker:
        image: “digdag/digdag-python:3.9”
      py>: python__files.autosegment__script.run__model
      __env:
        td__api__key: ${secret:td__api__key}
```

-continued

```
session__id: ${session__id}
td__api__server: $ api__endpoint}
sink__database: ${sink__database}
input__table: as__base__table
final__cluster__table: ${final__predict__table}
user__id: ${user__id}
excl: ${excl}
semi__supervised: ${semi__supervised}
pr__high: ${prioritize.high}
pr__med: ${prioritize.med}
pr__low: ${prioritize.low}
prc__high: ${prioritize.high__coeff}
prc__med: ${prioritize.med__coeff}
```

-continued

```
        prc__low: ${prioritize.low__coeff}
        k__min: ${k__min}
        k__max: ${k__max}
        override__k: ${override__k}
  +feature__importances:
    td>: sql/feature__importance__rerank.sql
    create__table: as__feature__importances__temp
  #### Create Cluster Labels Table and add to Temp Tables
  +create__labels__table:
    td>: sql/create__as__labels__table.sql
    insert__into: as__labels
  +add__cluster__labels:
    for__each>:
      tt: ${temp__tables}
    __parallel: true
    __do
      +add:
```

-continued

```
          td>: sql/add__labels.sql
          insert__into: ${tt}
        +delete:
          if>: ${cleanup__temp__tables == 'yes'}
          __do:
            +clean__tables:
              td__ddl>:
              drop__tables: ["${tt}__temp"]
  +get__dash__histograms:
    td>: sql/dash__histograms.sql
    create__table: as__dash__histograms
  +get__dash__compactness:
    td>: sql/dash__compactness.sql
    create__table: as__dash__compactness
```

ML_AUTOSEG_UPDATE_LABELS.DIG

```
__export:
  !include : 'config/input__params.yml'
  td:
    database: ${sink__database}
    engine: presto
+stage__filter__schema__table:
  td__ddl>:
  empty__tables: ["schema"]
+loop__through__custom__labels:
  for__each>:
    cluster__label: ${label__logic}
  __parallel: true
  __do:
    +write__schema:
      td>: sql/write__logic__to__schema.sql
+generate__query:
  td>: sql/data__generate__query.sql
  store__last__results: true
+create__final__table:
  td>: sql/create__final__cluster__table.sql
  create__table: ${final__predict__table}__temp
+rename__temp__table:
  td__ddl>:
  rename__tables: [{from: "${final__predict__table}__temp", to: "${final__predict__table}"}]
#### Create Cluster Labels Table and add to Temp Tables
#### These three steps replace the cluster__labels for the last session__id only (not inserting new session__id labels)
+insert__labels:
  td>: sql/create__as__labels__table.sql
  insert__into: as__labels
+rename__table:
  td__ddl>:
  rename__tables: [{from: "as__labels", to: "as__labels__temp"}]
+update__labels__table:
  td>: sql/update__as__labels__table.sql
  create__table: as__labels
+add__cluster__labels:
  for__each>:
    tt: ${temp__tables}
  __parallel: true
  __do:
    td>: sql/add__labels.sql
    create__table: ${tt}
#### Update Dashboard with new labels
+run__model__refresh__build__wf:
  if>: ${create__dashboard == 'yes'}
  __do:
    +update__dash:
      call>: datamodel__build.dig
############## CLEANUP TEMP TABLES ##########################
+check__if__cleanup__temp__tables__required:
  if>: ${cleanup__temp__tables == 'yes'}
  __do
    +clean__tables:
      td__ddl>:
      drop__tables: ["schema", "as__labels__temp"]
ML__AUTOSEGMENTATION__LAUNCH.DIG
#################### ERROR EMAIL NOTIFICATION ##########################
# __error:
```

-continued

```
#   mail>: body.txt
#   subject: Autosegmentation Workflow Failed - Customer Name
#   to: ['ps-ml-analytics@treasure-data.com']
###################### MAIN WORKFLOW
####################################
__export:
  !include : 'config/input__params.yml'
  td:
    database: ${sink__database}
    engine: presto
###### Update Labels/Audiences OR Re-Run Model#######
+check__if__update__cluster__lables:
  if>: ${retrain__model=='no'}
  __do:
    +update__cluster__labels__in__final__table:
      call>: ml__autoseg__update__labels.dig
    +check__if__predictions:
      if>: ${make__predictions=='yes'}
      __do:
        +call__prediction__workflow:
          call>: ml__autoseg__predict.dig
    +check__if__add__labels__to__ps__and__auto__create__segments:
      if>: ${create__segments == 'yes'}
      __do:
        call>: ml__auto__build__audiences.dig
###### Run initial K-Means Model #########
  __else__do:
    ### Pre-Modeling and EDA
    +call__sub__wf:
      call>: ml__autoseg__premodel.dig
    +run__model:
      call>: ml__autoseg__py.dig
#### Build & Update Dashboard and Auto-Build Segments ######
    +check__if__dashboard__and__audiences__must__be__built:
      __parallel: true
      +check__if__need__to__create__dashboard:
        if>: ${create__dashboard=='yes'}
        __do:
          +run__model__create__wf:
            call>: datamodel__create.dig
          +run__model__refresh__build__wf:
            call>: datamodel__build.dig
```

What is claimed is:

1. A computer-implemented method comprising:

receiving, using a customer data platform (CDP) instance, customer data from one or more data sources and storing the customer data in a first table of a SQL-based relational database of a multi-tenant data store, the table of the customer data comprising thousands to millions of rows, each row corresponding to a customer profile;

executing segmentation instructions using the CDP instance to cause the CDP instance to perform:

receiving input specifying context data;

executing a plurality of SQL queries with the first table, including join and filter queries, to create and store a second table of the SQL-based relational database of new user data to predict, new feature data, and to create new cluster labels, based in part on K-means model parameters, of a trained K-means clustering machine-learning model, stored in a third table of the SQL-based relational database;

executing a real-time scoring function on the second table;

using the trained K-means clustering machine-learning model and the second table, including adjusting one or more parameters of the trained K-means clustering machine-learning model based on the context data, outputting a prediction of a first audience segment, the first audience segment comprising one or more profiles of the customer data selected from among all the customer data and relevant to the context data;

communicating the first audience segment to activation instructions, programmed to activate campaigns on a plurality of different communication channels;

dispatching individual communications via personalized communication interfaces toward media servers for communication to customers or users;

a first workflow configured or programmed to re-train the trained K-means clustering machine-learning model, executed under a file or script having script commands that create and store data, implement an auto-segmentation function to re-train a clustering model, and create output tables; and a second workflow, executed under a different file or script, programmed to identify the new user data, perform data cleaning and transformation processes, and execute predictions using output tables produced by the first workflow.

2. The computer-implemented method of claim 1, further comprising:

presenting the first audience segment in an audience editor;

receiving second input specifying one or more custom weight values to prioritize attribute data specifying customer behaviors or attributes; and repeating executing the real-time scoring function with the customer data and using the trained K-means clustering machine-learning model including adjusting one or more parameters of the trained machine-learning model based on the one or more custom weight values to cause outputting a second prediction of a second audience segment, the second audience segment comprising one or more second profiles of the customer data selected from among all the customer data and focused on the attribute data.

3. The computer-implemented method of claim 2, further comprising executing exploratory data analysis (EDA) instructions programmed to generate metadata describing the second audience segment via aggregation algorithms and statistical algorithms, store the metadata in a statistical database, and generate presentation instructions that are programmed to cause displaying a plurality of different visual representations of the metadata as a visual dashboard on computer display devices with graphical user interfaces.

4. The computer-implemented method of claim 3, the EDA instructions comprising SQL-based code implementing one or more PRESTO and HIVE functions and operations.

5. The computer-implemented method of claim 4, wherein the trained machine-learning model comprises a Python-based semi-supervised K-means clustering model; the computer-implemented method further comprising:

selecting a minimal required dataset sample representative of the customer data and relevant to the context data; and retraining the trained machine-learning model on the minimal required dataset sample.

6. The computer-implemented method of claim 2, wherein the new user data specifies new profiles to be added to the customer data or changes in behaviors and attributes of existing profiles; and wherein executing the plurality of SQL queries includes executing a predictions sub-process to fit the new user data to the first audience segment and the second audience segment.

7. The computer-implemented method of claim 6, wherein executing the predictions sub-process comprises using a nearest-neighbor function to find a particular cluster centroid value in a column of a model table of the customer data that is closest to each new user.

8. The computer-implemented method of claim 1, wherein the segmentation instructions comprise a YAML file with instructions for executing the first workflow based on specified configuration files.

9. The computer-implemented method of claim 1, wherein the context data comprises a plurality of different segment labels, each label among the plurality of different segment labels representing a different combination of user attributes and/or behaviors.

10. The computer-implemented method of claim 1, wherein the first workflow executes Markov model-based re-training.

11. The computer-implemented method of claim 1, wherein the second workflow executes Markov model-based predictions.

12. A computer system comprising:

one or more hardware processors; and one or more non-transitory computer-readable storage media storing one or more sequences of instructions which, when executed using the one or more hardware processors, cause the one or more hardware processors to execute:

receiving, using a customer data platform (CDP) instance, customer data from one or more data sources and storing the customer data in a first table of a SQL-based relational database of a multi-tenant data store, the table of the customer data comprising thousands to millions of rows, each row corresponding to a customer profile;

executing segmentation instructions using the CDP instance to cause the CDP instance to perform:

receiving input specifying context data;

executing a plurality of SQL queries with the first table, including join and filter queries, to create and store a second table of the SQL-based relational database of new user data to predict, new feature data, and to create new cluster labels, based in part on K-means model parameters, of a trained K-means clustering machine-learning model, stored in a third table of the SQL-based relational database;

executing a real-time scoring function on the second table;

using the trained K-means clustering machine-learning model and the second table, including adjusting one or more parameters of the trained K-means clustering machine-learning model based on the context data, outputting a prediction of a first audience segment, the first audience segment comprising one or more profiles of the customer data selected from among all the customer data and relevant to the context data;

communicating the first audience segment to activation instructions, programmed to activate campaigns on a plurality of different communication channels;

dispatching individual communications via personalized communication interfaces toward media servers for communication to customers or users;

a first workflow configured or programmed to re-train the trained K-means clustering machine learning model, executed under a file or script having script commands that create and store data, implement an auto-segmentation function to re-train a clustering model, and create output tables; and a second workflow, executed under a different file or script, programmed to identify the new user data, perform data cleaning and transformation processes, and execute predictions using output tables produced by the first workflow.

13. The computer system of claim 12, further comprising sequences of instructions which, when executed using the one or more hardware processors, cause the one or more hardware processors to execute:

presenting the first audience segment in an audience editor;

receiving second input specifying one or more custom weight values to prioritize attribute data specifying customer behaviors or attributes; and repeating executing the real-time scoring function with the customer data and using the trained K-means clustering machine-learning model, including adjusting one or more parameters of the trained machine-learning model based on the one or more custom weight values to cause outputting a second prediction of a second audience segment, the second audience segment comprising one or more second profiles of the customer data selected from among all the customer data and focused on the attribute data.

14. The computer system of claim 13, further comprising sequences of instructions which, when executed using the one or more hardware processors, cause the one or more hardware processors to execute exploratory data analysis (EDA) instructions programmed to generate metadata describing the second audience segment via aggregation algorithms and statistical algorithms, store the metadata in a statistical database, and generate presentation instructions that are programmed to cause displaying a plurality of different visual representations of the metadata as a visual dashboard on computer display devices with graphical user interfaces.

15. The computer system of claim 14, the EDA instructions comprising SQL-based code implementing one or more PRESTO and HIVE functions and operations.

16. The computer system of claim 15, wherein the trained machine-learning model comprises a Python-based semi-supervised K-means clustering model; the computer system further comprising sequences of instructions which, when executed using the one or more hardware processors, cause the one or more hardware processors to execute:

selecting a minimal required dataset sample representative of the customer data and relevant to the context data; and retraining the trained machine-learning model on the minimal required dataset sample.

17. The computer system of claim 13, wherein the new user data specifies new profiles to be added to the customer data or changes in behaviors and attributes of existing profiles; and wherein executing the plurality of SQL queries includes executing a predictions sub-process to fit the new user data to the first audience segment and the second audience segment.

18. The computer system of claim 17, further comprising sequences of instructions which, when executed using the one or more hardware processors, cause the one or more hardware processors to execute the predictions sub-process using a nearest-neighbor function to find a particular cluster centroid value in a column of a model table of the customer data that is closest to each new user.

19. The computer system of claim 12, wherein the segmentation instructions comprise a YAML file with instructions for executing the first workflow based on specified configuration files.

20. The computer system of claim 12, wherein the context data comprises a plurality of different segment labels, each label among the plurality of different segment labels representing a different combination of user attributes and/or behaviors.

21. The computer system of claim 12, wherein the first workflow executes Markov model-based re-training.

22. The computer system of claim 12, wherein the second workflow executes Markov model-based predictions.

* * * * *